(12) United States Patent
Hara et al.

(10) Patent No.: US 11,527,751 B2
(45) Date of Patent: Dec. 13, 2022

(54) NONAQUEOUS ELECTROLYTE BATTERY AND BATTERY PACK

(71) Applicant: KABUSHIKI KAISHA TOSHIBA, Minato-ku (JP)

(72) Inventors: Ryo Hara, Kashiwazaki (JP); Dai Yamamoto, Kashiwazaki (JP); Keigo Hoshina, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 213 days.

(21) Appl. No.: 16/812,431

(22) Filed: Mar. 9, 2020

(65) Prior Publication Data

US 2020/0212441 A1 Jul. 2, 2020

Related U.S. Application Data

(63) Continuation of application No. PCT/JP2017/038730, filed on Oct. 26, 2017.

(51) Int. Cl.
*H01M 4/505* (2010.01)
*H01M 4/131* (2010.01)
(Continued)

(52) U.S. Cl.
CPC ........... *H01M 4/505* (2013.01); *H01M 4/131* (2013.01); *H01M 4/364* (2013.01); *H01M 4/525* (2013.01);
(Continued)

(58) Field of Classification Search
None
See application file for complete search history.

(56) References Cited

U.S. PATENT DOCUMENTS

| 6,534,216 B1 | 3/2003 | Narukawa et al. |
| 9,105,943 B2 | 8/2015 | Jeon et al. |

(Continued)

FOREIGN PATENT DOCUMENTS

| CN | 106104867 A | 11/2016 |
| JP | 2003-297422 A | 10/2003 |

(Continued)

OTHER PUBLICATIONS

International Search Report dated Dec. 12, 2017 in PCT/JP2017/038730 filed on October 26, 2017, citing documents AE-AF & AR-AV therein, 2 pages (Continued)

*Primary Examiner* — Karie O'Neill Apicella
(74) *Attorney, Agent, or Firm* — Oblon, McClelland, Maier & Neustadt, L.L.P.

(57) ABSTRACT

According to one embodiment, provided is a nonaqueous electrolyte battery including a positive electrode, a negative electrode, and a nonaqueous electrolyte. The positive electrode includes lithium manganese composite oxide particles having a spinel crystal structure and lithium cobalt composite oxide particles. The negative electrode includes a titanium-containing oxide. The nonaqueous electrolyte contains a propionate ester. The battery satisfies $0.8 \leq p/n \leq 1.2$ and $1 \leq w/s \leq 60$. p denotes a capacity per unit area of the positive electrode. n denotes a capacity per unit area of the negative electrode. w denotes a content of the propionate ester in the nonaqueous electrolyte and is in a range of 10% by weight to 60% by weight. s denotes an average particle size of the lithium manganese composite oxide particles.

8 Claims, 4 Drawing Sheets

(51) Int. Cl.
*H01M 4/36* (2006.01)
*H01M 4/525* (2010.01)
*H01M 10/0525* (2010.01)
*H01M 50/20* (2021.01)
*H01M 4/02* (2006.01)

(52) U.S. Cl.
CPC ....... *H01M 10/0525* (2013.01); *H01M 50/20* (2021.01); *H01M 2004/021* (2013.01); *H01M 2004/027* (2013.01); *H01M 2004/028* (2013.01)

(56) References Cited

U.S. PATENT DOCUMENTS

| | | |
|---|---|---|
| 2004/0018432 A1 | 1/2004 | Adachi et al. |
| 2005/0147889 A1 | 7/2005 | Ohzuku et al. |
| 2010/0266904 A1 | 10/2010 | Jeon et al. |
| 2012/0196190 A1 | 8/2012 | Jeon et al. |
| 2013/0029231 A1 | 1/2013 | Jeon et al. |
| 2014/0011098 A1 | 1/2014 | Jeon et al. |
| 2015/0340740 A1 | 11/2015 | Jeon et al. |
| 2016/0036026 A1 | 2/2016 | Kano et al. |
| 2016/0240849 A1* | 8/2016 | Kuriyama ............ H01M 50/116 |
| 2017/0288268 A1* | 10/2017 | Kim ................... H01M 10/0569 |
| 2018/0123129 A1* | 5/2018 | Takaoka ............ H01M 10/0566 |

FOREIGN PATENT DOCUMENTS

| | | |
|---|---|---|
| JP | 2004-087229 A | 3/2004 |
| JP | 2005-142047 A | 6/2005 |
| JP | 3754218 B2 | 3/2006 |
| JP | 2007-305447 A | 11/2007 |
| JP | 2008-135273 A | 6/2008 |
| JP | 2009-301954 A | 12/2009 |
| JP | 5433953 B2 | 3/2014 |
| JP | 2016-035901 A | 3/2016 |
| WO | WO 2016/132436 A1 | 8/2016 |
| WO | WO 2016/175148 A1 | 11/2016 |

OTHER PUBLICATIONS

Extended European Search Report dated May 21, 2021 in European Patent Application No.17929781.7 citing documents AA and AB therein, 8 pages.

* cited by examiner

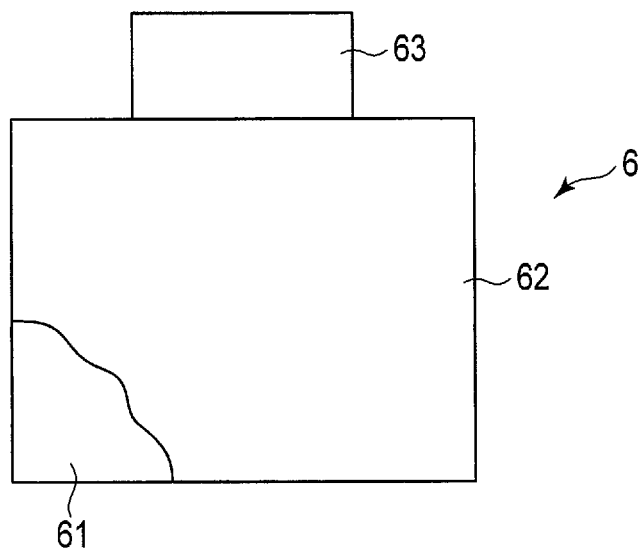
F I G. 3
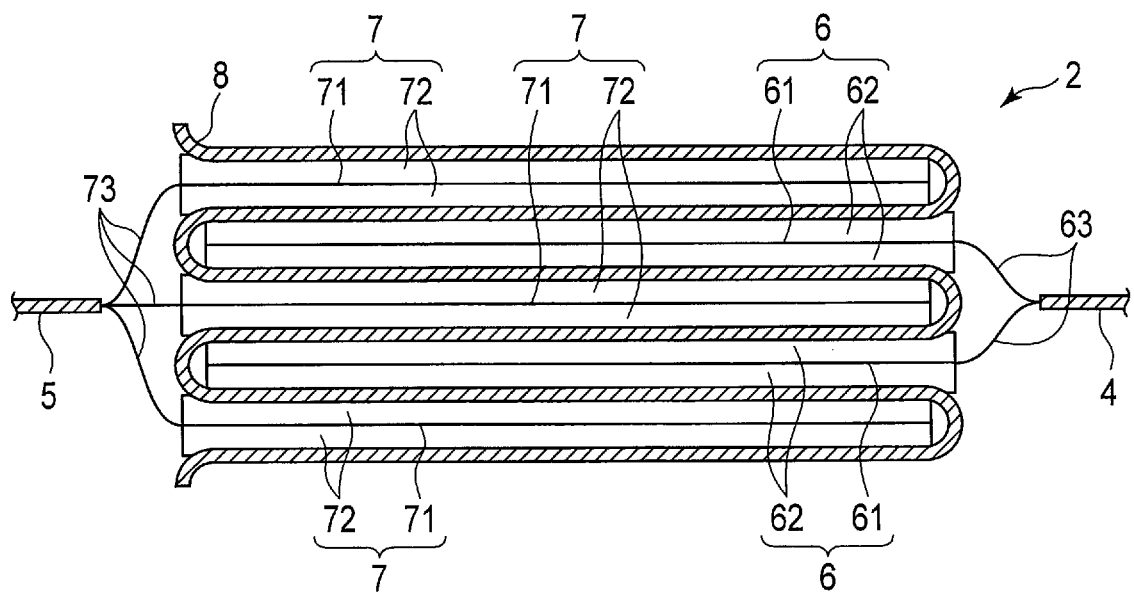
F I G. 4

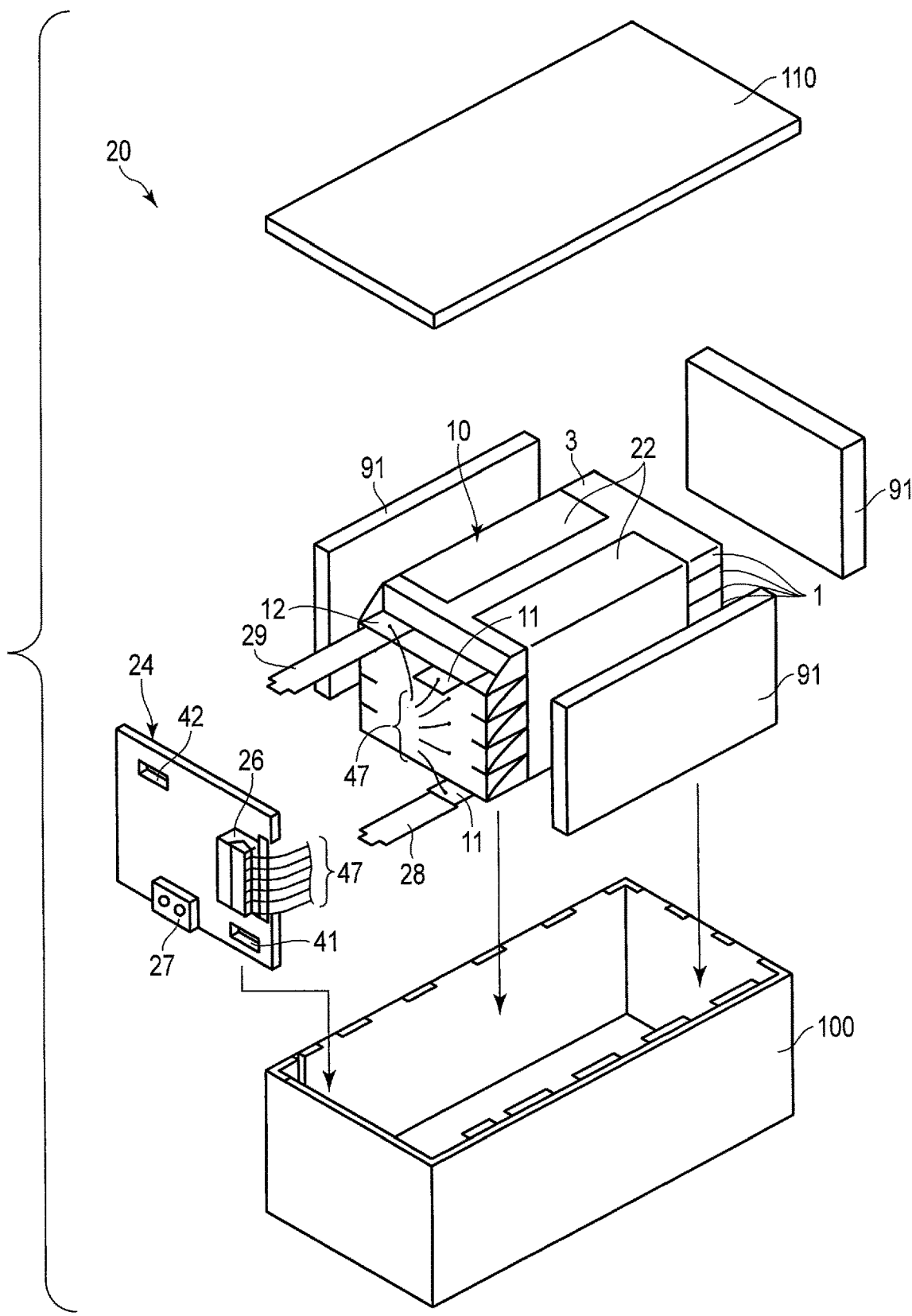
F I G. 5

NONAQUEOUS ELECTROLYTE BATTERY AND BATTERY PACK

This application is a Continuation Application of PCT Application No. PCT/JP2017/038730, filed Oct. 26, 2017, the entire content of which is incorporated herein by reference.

FIELD

Embodiments of the present invention generally relate to a nonaqueous electrolyte battery and a battery pack.

BACKGROUND

A lithium-ion secondary battery, in which charge and discharge are performed by movement of lithium ions between a positive electrode and a negative electrode, has advantages of being able to obtain high energy density and high output. Putting such advantages into use, application of lithium ion secondary batteries has been widely under progress from small-scale use such as portable electronic devices to large-scale use such as electric automobiles and electric power supply adjustment systems.

A nonaqueous electrolyte battery using a lithium titanium composite oxide, with a high lithium insertion and extraction potential of about 1.55 V based on a lithium electrode, has also been put to practical use as the negative electrode active material, in place of a carbon material. The lithium titanium composite oxide has excellent cycle performance because of its change in volume accompanying charge and discharge being little. In a negative electrode including the lithium titanium composite oxide, precipitation of lithium metal at the time of lithium insertion and extraction can be suppressed. As a result, a secondary battery provided with this negative electrode is capable of being charged with a large current.

Regarding the positive electrode active material, lithium manganese oxide ($LiMn_2O_4$) has advantages of being an abundant resource, being inexpensive, having little environmental burden and having high safety in an over-charged state. Therefore, the lithium manganese oxide is being considered as an alternative material for lithium cobaltate ($LiCoO_2$). On the other hand, with the lithium manganese oxide, deterioration in battery performance due to gas generation, elution of manganese under high-temperature environment, and the like, has been an issue.

BRIEF DESCRIPTION OF THE DRAWINGS

FIG. 3 is a schematic plan view showing a positive electrode included in the nonaqueous electrolyte shown in FIG. 1;

FIG. 4 is a schematic cross-sectional view showing another example of an electrode group, which may be included in the nonaqueous electrolyte battery according to the first embodiment;

FIG. 5 is an exploded perspective view of a battery pack of an example according to a second embodiment.

DETAILED DESCRIPTION

Figure 1:
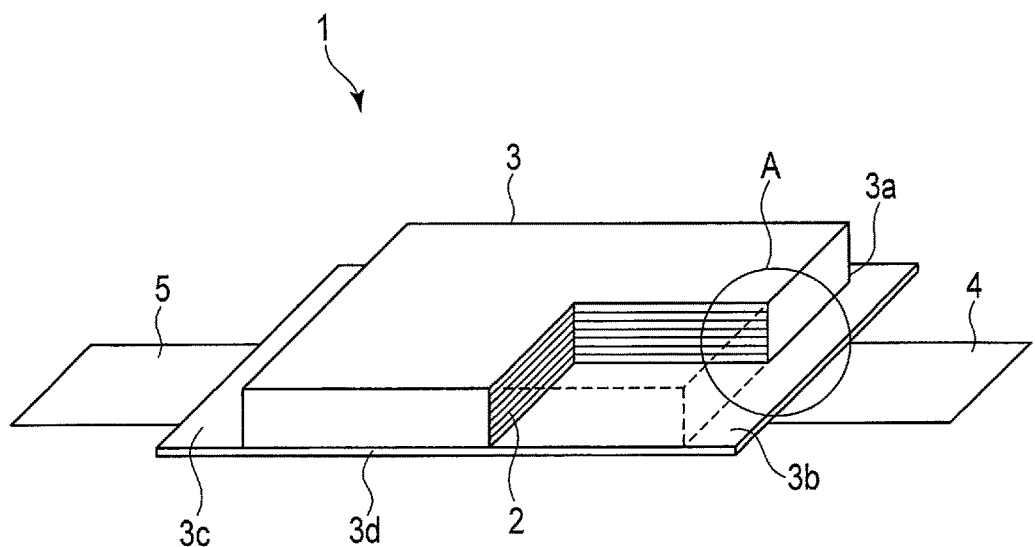
FIG. 1 is a schematic cut-out perspective view showing an example of a nonaqueous electrolyte battery according to a first embodiment.

According to a first embodiment, a nonaqueous electrolyte battery is provided. The nonaqueous electrolyte battery includes a positive electrode, a negative electrode, and a nonaqueous electrolyte. The positive electrode includes a positive electrode active material-containing layer. The positive electrode active material-containing layer contains lithium manganese composite oxide particles having a spinel crystal structure and lithium cobalt composite oxide particles. The negative electrode includes a titanium-containing oxide. The nonaqueous electrolyte contains a propionate ester. The nonaqueous electrolyte battery satisfies equations $0.8 \leq p/n \leq 1.2$ and $1 \leq w/s \leq 60$. p denotes a capacity [$mAh/cm^2$] per unit area of the positive electrode. n denotes a capacity [$mAh/cm^2$] per unit area of the negative electrode. w denotes a content of the propionate ester in the nonaqueous electrolyte and is in a range of 10% by weight to 60% by weight. s denotes an average particle size [μm] of the lithium manganese composite oxide particles.

According to a second embodiment, a battery pack is provided. The battery pack includes the nonaqueous electrolyte battery according to the first embodiment.

Hereinafter, embodiments will be described with reference to the drawings. The same reference signs are applied to common components throughout the embodiments and overlapping explanations are omitted. Each drawing is a schematic view for explaining the embodiment and promoting understanding thereof; though there may be differences in shape, size and ratio from those in an actual device, such specifics can be appropriately changed in design taking the following explanations and known technology into consideration.

First Embodiment

According to a first embodiment, a nonaqueous electrolyte battery is provided. The nonaqueous electrolyte battery includes a positive electrode, a negative electrode, and a nonaqueous electrolyte. The positive electrode includes a positive electrode active material-containing layer. The positive electrode active material-containing layer contains lithium manganese composite oxide particles having a spinel crystal structure and lithium cobalt composite oxide particles. The negative electrode includes a titanium-containing oxide. The nonaqueous electrolyte contains a propionate ester. The nonaqueous electrolyte battery satisfies equations $0.8 \leq p/n \leq 1.2$ and $1 \leq w/s \leq 60$. p denotes a capacity [$mAh/cm^2$] per unit area of the positive electrode. n denotes a capacity [$mAh/cm^2$] per unit area of the negative electrode. w denotes a content of the propionate ester in the nonaqueous electrolyte and is within a range of 10% by weight to 60% by weight. s denotes an average particle size [μm] of the lithium manganese composite oxide particles.

As a result of conducting intensive research, the inventors have found that gas generation occurring in a nonaqueous electrolyte battery was particularly noticeable when the nonaqueous electrolyte battery was in a high charge state and while being placed in a high temperature environment.

One of the causes of such gas generation is decomposition of a nonaqueous electrolyte on a surface of a positive electrode. The oxidative decomposition of the nonaqueous electrolyte on a surface of a positive electrode current collector can be suppressed by, for example, forming a passive film on the surface of the positive electrode current collector. However, such a measure cannot suppress the decomposition of the nonaqueous electrolyte on the surface of the active material-containing layer.

As a result of conducting intensive research to find a measure to suppress gas generation even when a nonaqueous electrolyte battery is in a high charge state and is placed in a high temperature environment, the inventors have arrived at the nonaqueous electrolyte battery according to the first embodiment.

The nonaqueous electrolyte battery according to the first embodiment can exhibit a low resistance value and can also suppress gas generation. The mechanism thereof is not fully understood; however, it is believed to be, for example, as described below.

First, in the nonaqueous electrolyte battery according to the first embodiment, for which a value of capacity ratio p/n is 1.2 or less, the potential of lithium manganese composite oxide particles contained in a positive electrode active material-containing layer can be prevented from becoming too low during charging and discharging. The lithium manganese composite oxide particles have a property where the particles tend to elute manganese when the potential becomes too low. The eluted manganese acts on a negative electrode to cause gas generation from the negative electrode. Since the nonaqueous electrolyte battery according to the first embodiment can suppress elution from the lithium manganese composite oxide, gas generation from the negative electrode can be suppressed.

Also, in the nonaqueous electrolyte battery according to the first embodiment, for which a value of capacity ratio p/n is 0.8 or more, the potential of the lithium manganese composite oxide particles contained in the positive electrode active material-containing layer can be prevented from becoming too high during charging and discharging. The lithium manganese composite oxide particles promote decomposition of a nonaqueous electrolyte on a surface of a positive electrode containing the composite oxide particles, when the potential becomes too high. Since the nonaqueous electrolyte battery according to the first embodiment can prevent the potential of the lithium manganese composite oxide particles from becoming too high, decomposition of the nonaqueous electrolyte on the surface of the positive electrode can be suppressed.

In addition, the nonaqueous electrolyte included in the nonaqueous electrolyte battery according to the first embodiment includes a propionate ester. Propionate esters have an oxidative resistance lower than that of typical linear carbonate solvents. Further, in the nonaqueous electrolyte battery according to the first embodiment satisfying the equation $0.8 \leq p/n \leq 1.2$, the positive electrode can be put into a potential that promotes oxidative decomposition of the propionate ester. As a result, oxidative decomposition products of the propionate ester can be provided in the nonaqueous electrolyte. The lithium cobalt composite oxide particles are believed to exhibit catalytic action for an oxidative reaction that generates the oxidative decomposition products.

The nonaqueous electrolyte battery according to the first embodiment satisfies the equation $1 \leq w/s \leq 60$. Here, w denotes a content of the propionate ester in the nonaqueous electrolyte, and is in a range of 10% by weight to 60% by weight. The s denotes an average particle size [μm] of the lithium manganese composite oxide. In the nonaqueous electrolyte battery satisfying the equation, the oxidative decomposition products of the propionate ester can act specifically on the positive electrode containing the lithium manganese composite oxide particles. Specifically, the oxidative decomposition products of the propionate ester can also prevent decomposition of the nonaqueous electrolyte, for example a nonaqueous solvent, on the surface of the positive electrode active material-containing layer. In addition, the nonaqueous electrolyte battery satisfying the above equation can prevent the decomposition products of the propionate ester from being excessively formed on the positive electrode. As a result, the nonaqueous electrolyte battery according to the first embodiment can exhibit a low resistance value.

The oxidative decomposition products of the propionate ester can also suppress decomposition thereof by interacting with the lithium manganese composite oxide particles. Therefore, gas generation from the positive electrode originating in the nonaqueous electrolyte including the propionate ester can be suppressed.

As a result, along with being able to exhibit a low resistance value, the nonaqueous electrolyte battery according to the first embodiment can suppress gas generation. Since the nonaqueous electrolyte battery according to the first embodiment can exhibit a low resistance value and suppress gas generation, the battery can also exhibit a high output and excellent life performance.

In a nonaqueous electrolyte battery having a content w of less than 10% by weight, oxidative decomposition products of the propionate ester are not sufficiently formed, and elution of manganese and decomposition of the nonaqueous electrolyte cannot be sufficiently suppressed. For example, in a nonaqueous electrolyte battery which includes a positive electrode containing lithium cobalt composite oxide particles and lithium manganese composite oxide particles, where a nonaqueous electrolyte of the battery does not include a propionate ester, although the lithium cobalt composite oxide particles exhibit an effect of suppressing gas generated by the lithium manganese composite oxide particles, the reaction between the positive electrode active material-containing layer and the nonaqueous electrolyte cannot be sufficiently suppressed.

In a nonaqueous electrolyte battery having a content w of more than 60% by weight, the oxidative decomposition products of the propionate ester are excessively formed. An excess of oxidative decomposition products increases the resistance value of the positive electrode. Thus, such a battery cannot exhibit a low resistance value.

The content w of the propionate ester is preferably in a range of 30% by weight to 50% by weight, and more preferably in a range of 30% by weight to 42% by weight.

Details will be explained below, but a battery having, a content w in a range of 10% by weight to 60% by weight and having a ratio w/s of less than 1 or a ratio w/s of more than 60, cannot suppress gas generation or cannot exhibit a low resistance value. It has been found as a result of intensive research conducted by the inventors that the ratio w/s has a large influence on the amount of gas generated and on the resistance value.

A nonaqueous electrolyte battery having a ratio w/s of more than 60 is, for example, a battery in which the average particle size s of the lithium manganese composite oxide particles is too small with respect to the content w of the propionate ester. The smaller the average particle size of the particles, the larger the specific surface area of the particles. Therefore, the nonaqueous electrolyte battery having a ratio w/s of more than 60 can also be said to be a battery in which the specific surface area of the lithium manganese composite oxide particles is too large with respect to the content w of the propionate ester. In such a battery, the amount of the oxidative decomposition products of the propionate ester is insufficient relative to the area of the surfaces of the lithium manganese composite oxide particles, which are the sources of the manganese elution and the reaction fields of the decomposition reaction of the nonaqueous electrolyte. Therefore, such a battery cannot sufficiently suppress the gas generation caused by the elution of manganese or the decomposition reaction of the nonaqueous electrolyte.

On the other hand, a nonaqueous electrolyte battery having a ratio w/s of less than 1 is, for example, a battery in which the average particle size s of the lithium manganese composite oxide particles is too large with respect to the content w of the propionate ester. Such a battery can also be said to be a battery in which the content w of the propionate ester is too large with respect to the specific surface area of the lithium manganese composite oxide particles. In such a battery, the oxidative decomposition products of the propionate ester are excessively formed relative to the surface area of the lithium manganese composite oxide particles. Therefore, such a battery exhibits a high resistance value.

The ratio w/s is preferably in a range of 2.4 to 15.4, and more preferably in a range of 3.4 to 12.6.

In a nonaqueous electrolyte battery having a capacity ratio p/n of more than 1.2, the potential of the lithium manganese composite oxide particles tends to fall too low during charging and discharging. The lithium manganese composite oxide particles tend to elute manganese when the potential becomes too low. Also, in the nonaqueous electrolyte battery having a capacity ratio p/n of more than 1.2, the oxidative decomposition of the propionate ester does not progress sufficiently, whereby the effect by the oxidative decomposition products, in which the decomposition of the nonaqueous electrolyte is suppressed, cannot be sufficiently utilized. Therefore, such a nonaqueous electrolyte battery cannot suppress gas generation. On the other hand, in a nonaqueous electrolyte battery having a capacity ratio p/n of less than 0.8, the potential of the lithium manganese composite oxide particles tends to rise too high during charging and discharging. When the potential of the lithium manganese composite oxide particles is too high, decomposition of the nonaqueous electrolyte is promoted on the surface of the positive electrode containing the composite oxide particles. Therefore, such a nonaqueous electrolyte battery cannot suppress gas generation. Also, the nonaqueous electrolyte battery having a capacity ratio p/n of less than 0.8 exhibits a low energy density. The capacity ratio p/n is preferably in a range of 0.8 to 1, and more preferably in a range of 0.9 to 1.

The capacity ratio p/n of the nonaqueous electrolyte battery can be controlled by, for example, the applied amount of a slurry for producing the positive electrode and a slurry for producing the negative electrode, as well as the species and the blending ratio of the active materials and the mixing ratio of auxiliary materials such as an electro-conductive agent and a binder in the respective slurries. For example, according to the procedure described in the examples, nonaqueous electrolyte batteries having a capacity ratio p/n in a range of 0.8 to 1.2 can be produced.

As described above, the lithium cobalt composite oxide particles can exhibit catalytic action that promotes an oxidative decomposition reaction of the propionate ester. In a nonaqueous electrolyte battery in which the positive electrode active material-containing layer contains no lithium cobalt composite oxide particles, such a catalytic action cannot be utilized, and thus, the oxidative decomposition reaction of the propionate ester does not progress sufficiently. Therefore, such a battery cannot sufficiently suppress elution of manganese or decomposition of the nonaqueous electrolyte, and accordingly cannot sufficiently suppress gas generation.

In a battery where the positive electrode active material-containing layer contains no lithium manganese composite oxide particles, the oxidative decomposition products of the propionate ester cannot stably exist, resulting in gas generation.

In a preferred aspect, the nonaqueous electrolyte battery satisfies equation $0.01 \leq B/(A+B) \leq 0.1$. Here, A denotes a content [% by weight] of the lithium manganese composite oxide particles in the positive electrode active material-containing layer. B denotes a content [% by weight] of the lithium cobalt composite oxide particles in the positive electrode active material-containing layer. In the nonaqueous electrolyte battery according to the preferred aspect that satisfies the above expression, more balanced use can be made between the catalytic action by the lithium cobalt composite oxide particles on the oxidative decomposition reaction of the propionate ester and the action by the lithium manganese composite oxide particles of suppressing decomposition of the oxidative decomposition products of the propionate ester. More preferably, the nonaqueous electrolyte battery satisfies equation $0.01 \leq B/(A+B) \leq 0.04$.

In a nonaqueous electrolyte battery in which the negative electrode contains no titanium-containing oxide, gas generation during charging and discharging cannot be suppressed, even if the capacity ratio p/n is set to be 1.2 or less. For example, if a negative electrode containing a carbon material, such as graphite, as an active material is used, the negative electrode may have a potential lower than that of a negative electrode containing a titanium-containing oxide. On such a negative electrode having a low potential, the propionate ester is subjected to reductive decomposition. Therefore, a battery including such a negative electrode cannot utilize the action by the oxidative decomposition products of the propionate ester on the positive electrode.

Next, the nonaqueous electrolyte battery according to the first embodiment will be described in more detail.

The nonaqueous electrolyte battery according to the first embodiment includes a positive electrode, a negative electrode, and a nonaqueous electrolyte.

The positive electrode may include a positive electrode current collector. The positive electrode current collector may have, for example, a planar shape like that of a belt. The belt-shaped positive electrode current collector may have two faces including a first face and a second face that is a reverse face to the first face.

The positive electrode includes a positive electrode active material-containing layer. The positive electrode active material-containing layer may be formed, for example on two surfaces of the positive electrode current collector, or on one of the surfaces. The positive electrode current collector may include a portion that does not support the positive electrode active material-containing layer on any surface. This portion can serve as a positive electrode lead.

The negative electrode may include a negative electrode current collector. The negative electrode current collector may have, for example, a planar shape like that of a belt. The belt-shaped negative electrode current collector may have two faces including a first face and a second face that is a reverse face to the first face.

The negative electrode may further include a negative electrode active material-containing layer. The negative electrode active material-containing layer may be formed, for example on two surfaces of the negative electrode current collector, or on one of the surfaces. The negative electrode current collector may include a portion that does not support the negative electrode active material-containing layer on any surface. This portion can serve as a negative electrode lead.

The positive electrode and negative electrode can configure an electrode group, by having the positive electrode active material-containing layer and the negative electrode active material-containing layer facing each other, with a separator sandwiched between.

The structure of the thus formed electrode group is not particularly limited. For example, the electrode group may have a stacked structure. The stacked structure has a structure in which the positive electrode and the negative electrode described above are stacked having the separator sandwiched therebetween. Alternatively, the electrode group may have a wound structure. The wound structure is a structure in which the positive electrode and the negative electrode described above are stacked with the separator sandwiched therebetween, and the thus obtained stack is spirally wound.

The nonaqueous electrolyte may, for example, be held in the electrode group. For example, the nonaqueous electrolyte may be impregnated into the electrode group.

The nonaqueous electrolyte may, for example, include a nonaqueous solvent and an electrolyte. The electrolyte may be dissolved in the nonaqueous solvent.

The nonaqueous electrolyte battery according to the first embodiment may further include a container for housing the electrode group and the nonaqueous electrolyte. The nonaqueous electrolyte battery according to the first embodiment can suppress gas generation, as described above. Therefore, the nonaqueous electrolyte battery according to the first embodiment can suppress an increase in the inner pressure of the container caused by gas generation and swelling of the container caused by the pressure increase.

The nonaqueous electrolyte battery according to the first embodiment may further include a positive electrode current collecting tab electrically connected to the above-described positive electrode lead, and a negative electrode current collecting tab electrically connected to the above-described negative electrode lead. The positive electrode current collecting tab and the negative electrode current collecting tab may be drawn outside of the above-described container to serve as a positive electrode terminal and a negative electrode terminal. Alternatively, the positive electrode current collecting tab and the negative electrode current collecting tab may also respectively be connected to the positive electrode terminal and the negative electrode terminal.

Next, materials of each component that may be included in the nonaqueous electrolyte battery according to the first embodiment are described in detail.

(Positive Electrode)

As the positive electrode current collector, for example, a metal foil such as that of aluminum or copper may be used.

The positive electrode active material-containing layer includes a lithium manganese composite oxide particle having a spinel crystal structure and a lithium cobalt composite oxide particle.

The lithium manganese composite oxide having a spinel crystal structure preferably has a composition represented by general formula $Li_aM_xMn_{2-x}O_4$, where the relationships $0<a\leq1.2$ and $0.2\leq x\leq0.7$ are satisfied, and M is at least one element selected from the group consisting of Mg, Ti, Cr, Fe, Co, Zn, Al, Li and Ga. The element M can be said to be an element that partially substitutes Mn of lithium manganate having a composition represented by general formula $Li_aMn_2O_4$. More preferably, x is in a range of $0.22\leq x\leq0.7$. The subscript a may vary within a range of $0<a\leq1.2$, according to the charge state of the lithium manganese composite oxide having a spinel crystal structure. In the lithium manganese composite oxide containing Li as the element M, the amount of Li as the element M does not change according to the charge state of the lithium manganese composite oxide. The lithium manganese composite oxide particles having a spinel crystal structure can serve as a positive electrode active material.

The lithium manganese composite oxide particles having a spinel crystal structure may be primary particles or secondary particles formed by agglomeration of primary particles. Alternatively, the lithium manganese composite oxide particles having a spinel crystal structure may be a mixture of primary particles and secondary particles. The lithium manganese composite oxide particles having a spinel crystal structure preferably include secondary particles.

The average particle size s [μm] of the lithium manganese composite oxide particles having a spinel crystal structure is an average particle size that does not distinguish between primary particles and secondary particles.

The average particle size s is preferably in a range of 1 μm to 10 μm. The average particle size s is more preferably in a range of 4 μm to 9 μm.

The lithium cobalt composite oxide particles may have a composition represented by general formula $Li_bCoO_2$, for example. In the general formula, subscript b can take a value in a range of $0<b\leq1.1$ according to the charge state of the lithium cobalt composite oxide. The lithium cobalt composite oxide can also be referred to as lithium cobaltate. The lithium cobalt composite oxide can serve as a positive electrode active material.

The lithium cobalt composite oxide particles may be primary particles or secondary particles formed by agglomeration of primary particles. Alternatively, the lithium cobalt composite oxide particles may be a mixture of primary particles and secondary particles. Preferably, the lithium cobalt composite oxide particles consist mainly of the primary particles. Specifically, the lithium cobalt composite oxide particles preferably include 90% by weight or more of the primary particles, and most preferably consist of the primary particles.

The average particle size t [μm] of the lithium cobalt composite oxide particles is an average particle size that does not distinguish between primary particles and secondary particles.

The average particle size t is preferably in a range of 3 μm to 12 μm. By using a lithium cobalt composite oxide having an average particle size t in a range of 3 μm to 12 μm, it is possible to suitably utilize the catalytic action for producing the oxidative decomposition products of the propionate ester. The average particle size t is more preferably in a range of 4 μm to 10 μm.

The ratio s/t of the particle sizes is preferably in a range of 0.25 to 4.2, and more preferably in a range of 0.3 to 2.5.

The positive electrode active material-containing layer may further include an electro-conductive agent. The electro-conductive agent preferably contains a carbon material. As carbon materials, for example, acetylene black, ketjen black, furnace black, graphite, and carbon nanotube can be cited. The positive electrode active material-containing layer may contain one or two or more of the above carbon materials, or further contain other electro-conductive agents.

In addition, the positive electrode active material-containing layer may further include a binder. The binder that may be contained in the positive electrode active material-containing layer is not particularly limited. For example, a polymer having good dispersibility in a mixing solvent for slurry preparation may be used as the binder. As such a polymer, for example, polyvinylidene fluoride, hexafluoro propylene, and polytetrafluoroethylene can be cited.

In the positive electrode active material-containing layer, the active material including a mixture of lithium manganese composite oxide particles having a spinel crystal structure and lithium cobalt composite oxide particles is preferably contained at a blending ratio of 87% by weight to 97% by weight, the electro-conducting agent is preferably contained at a blending ratio of 2% by weight to 12% by weight, and the binder is preferably contained at a blending ratio of 1% by weight to 8% by weight. The above blending ratios regard the weight of the positive electrode active material-containing layer as 100% by weight. A more preferable blending ratio is positive electrode active material:electro-conductive agent:binder=85% by weight to 95% by weight: 3% by weight to 10% by weight: 2% by weight to 5% by weight.

The positive electrode active material-containing layer preferably has a porosity of 20% to 50%. The positive electrode provided with the positive electrode active material-containing layer having such porosity is high in density and excellent in affinity with the nonaqueous electrolyte. A more preferable porosity is 25% to 40%.

A density of the positive electrode active material-containing layer is preferably 2.5 g/cm$^3$ or greater, and more preferably within a range of 2.7 g/cm$^3$ to 3.2 g/cm$^3$.

The positive electrode can be manufactured, for example, by the following method. First, a positive electrode active material mixture, which includes a mixture between lithium manganese composite oxide particles having a spinel crystal structure and lithium cobalt composite oxide particles, is prepared. Next, this positive electrode active material, an electro-conductive agent of choice, and a binder of choice are added into an appropriate solvent to obtain a mixture. Subsequently, the obtained mixture is put into a stirrer. The mixture is stirred in the stirrer to obtain slurry. The thus obtained slurry is applied onto the positive electrode current collector, then dried. The applied coat on the positive electrode current collector is pressed, whereby, there can be obtained a positive electrode including a positive electrode current collector and a positive electrode active material-containing layer formed on the positive electrode current collector. Other than that, the positive electrode active material, positive electrode electro-conductive agent, and binder may be formed into pellets, to be used as the positive electrode active material-containing layer.

(Negative Electrode)

As the negative electrode current collector, there may be used a material that is electrochemically stable in a potential range which is higher than 1.0 V with respect to the oxidation-reduction potential of Li. As the material of the negative electrode current collector, for example, a metal foil such as that of aluminum or copper may be used.

The negative electrode contains a titanium-containing oxide. The titanium-containing oxide can serve as the negative electrode active material. The titanium-containing oxide may be contained in the negative electrode active material-containing layer. The negative electrode active material-containing layer may contain an electro-conductive agent and a binder. The negative electrode active material-containing layer may further include a negative electrode active material other than the titanium-containing oxide.

Examples of titanium-containing oxides include lithium titanium composite oxides, anatase-type titanium-containing oxides, rutile-type titanium-containing oxides, bronze-type titanium-containing oxides, orthorhombic titanium-containing oxides, monoclinic niobium titanium-containing oxides, and metal composite oxides containing Ti and at least one element selected from the group consisting of P, V, Sn, Cu, Ni, Nb, and Fe.

The lithium titanium composite oxide includes lithium titanium composite oxide, and a lithium titanium composite oxide obtained by substituting a part of constituent elements of lithium titanium composite oxide with dopant elements. Examples of the lithium titanium composite oxide include lithium titanate having a spinel type crystal structure (e.g., $Li_{4+c}Ti_5O_{12}$ (c is a value that varies with charge and discharge, and takes a value within $0 \leq c \leq 3$)), lithium titanate having ramsdellite type crystal structure (e.g., $Li_{2+d}Ti_3O_7$ (d is a value that varies with charge and discharge, and takes a value within $0 \leq d \leq 3$)), and the like. The molar ratio of oxygen is formally shown as 12 for the spinel type $Li_{4+c}Ti_5O_{12}$ and 7 for the ramsdellite type $Li_{2+d}Ti_3O_7$. However, these values may vary due to the effect of oxygen non-stoichiometry or the like.

Examples of the metal composite oxide containing Ti and at least one element selected from the group consisting of P, V, Sn, Cu, Ni, Nb, and Fe include $TiO_2$—$P_2O_5$, $TiO_2$—$V_2O_5$, $TiO_2$—$P_2O_5$—$SnO_2$, and $TiO_2$—$P_2O_5$-MeO (Me is at least one element selected from the group consisting of Cu, Ni, and Fe), and the like. This metal composite oxide preferably has a microstructure with low crystallinity, where a crystal phase and an amorphous phase are coexistent, or an amorphous phase is singly existent. With such a microstructure, the cycle performance can be improved by a large degree.

The anatase-type, rutile-type, and bronze-type titanium-containing oxides may have a composition represented by $TiO_2$.

Examples of the orthorhombic titanium-containing oxide include a compound represented by the general formula $Li_{2+w}Na_{2-e}M1_fTi_{6-g}M2_gO_{14+\delta}$ where M1 is Cs and/or K and M2 is at least one selected from the group consisting of Zr, Sn, V, Nb, Ta, Mo, W, Fe, Co, Mn, and Al, and $0 \leq w \leq 4$, $0 \leq e < 2$, $0 \leq f \leq 2$, $0 \leq g < 6$, $-0.5 \leq \delta \leq 0.5$.

Examples of the monoclinic niobium titanium-containing oxide include a compound having a monoclinic crystal structure represented by the general formula $Li_hTi_{1-i}M3_iNb_{2-j}M4_jO_{7+o}$. In the above general formula, M3 is at least one selected from the group consisting of Zr, Si, Sn, Fe, Co, Mn, and Ni, and M4 is at least one selected from the group consisting of V, Nb, Ta, Mo, W, and Bi. Further, $0 \leq h \leq 5$, $0 \leq i < 1$, $0 \leq j \leq 2$, $-0.3 \leq o \leq 0.3$.

The titanium-containing oxide preferably includes the lithium titanium composite oxide. A negative electrode containing the titanium-containing oxide such as the lithium titanium composite oxide can exhibit a Li insertion potential of 0.4 V (vs. Li/Li$^+$) or greater, and thus can prevent precipitation of metallic lithium on the surface of the negative electrode upon repeated input and output at a large current. It is particularly preferable for the titanium-containing oxide to include the lithium titanium composite oxide having the spinel crystal structure.

The negative electrode active material may include an active material other than the lithium titanium composite oxide. In such a case, it is desirable to use an active material having a Li insertion potential of 0.4 V (vs. Li/Li$^+$) or higher.

The weight proportion taken up by the titanium-containing oxide in the negative electrode active material is preferably 90% by weight or greater. The negative electrode active material most preferably consists of the titanium-containing oxide.

As the electro-conductive agent and binder that may be contained in the negative electrode active material-containing layer, the same as those that may be contained in the positive electrode active material-containing layer may be used.

In the negative electrode active material-containing layer, the negative electrode active material including titanium-containing oxide is preferably contained at a blending ratio of 87% by weight to 97% by weight, the electro-conducting agent is preferably contained at a blending ratio of 2% by weight to 12% by weight, and the binder is preferably contained at a blending ratio of 1% by weight to 8% by weight. The above blending ratios regard the weight of the negative electrode active material-containing layer as 100% by weight. A more preferable blending ratio is negative electrode active material:electro-conductive agent: binder=85% by weight to 95% by weight: 3% by weight to 10% by weight 2% by weight to 5% by weight.

The negative electrode active material-containing layer preferably has a porosity of 20% to 50%. With the negative electrode active material-containing layer having such porosity, excellent affinity with the nonaqueous electrolyte can be exhibited, and high density may be achieved. A more preferable porosity is within a range of 25% to 40%.

A density of the negative electrode active material-containing layer is preferably 2 g/cm$^3$ or greater, and more preferably within a range of 2 g/cm$^3$ to 2.5 g/cm$^3$.

The negative electrode can be produced by, for example, the following method. First, as the negative electrode active material, a material including titanium-containing oxide is prepared. Next, this negative electrode active material, an electro-conductive agent of choice, and a binder of choice are added into an appropriate solvent to obtain a mixture. Subsequently, the obtained mixture is put into a stirrer. The mixture is stirred in the stirrer to obtain slurry. The thus obtained slurry is applied onto the negative electrode current collector, then dried. The applied coat on the negative electrode current collector is pressed, whereby, there can be obtained a negative electrode including a negative electrode current collector and a negative electrode active material-containing layer formed on the negative electrode current collector. Other than that, the negative electrode active material, negative electrode electro-conductive agent, and binder may be formed into pellets, to be used as the negative electrode active material-containing layer.

(Separator)

The separator is not particularly limited and, for example, a microporous film, woven fabric, nonwoven fabric, or a laminate of the same material or different material among these materials may be used. Materials forming the separator may include polyethylene, polypropylene, ethylene-propylene copolymer, ethylene-butene copolymer, and cellulose.

(Nonaqueous Electrolyte)

The propionate ester may be included in the nonaqueous electrolyte as a nonaqueous solvent, for example.

The propionate ester may include, for example, at least one selected from the group consisting of methyl propionate, ethyl propionate, propyl propionate, and butyl propionate. The propionate ester preferably includes at least one selected from the group consisting of methyl propionate and ethyl propionate.

As other examples of nonaqueous solvent, for example, ethylene carbonate (EC), propylene carbonate (PC), butylene carbonate (BC), dimethyl carbonate (DMC), diethyl carbonate (DEC), ethyl methyl carbonate (EMC), γ-butyrolactone (γ-BL), sulfolane, acetonitrile, 1,2-dimethoxy ethane, 1,3-dimethoxy propane, dimethyl ether, tetrahydrofuran (THF), and 2-methyltetrahydrofuran may be cited.

As the nonaqueous solvent, one solvent may be used alone, or there may be used a mixed solvent where two solvents or more are mixed. In a preferable aspect, the nonaqueous solvent consists of the propionate ester and a linear carbonate and/or cyclic carbonate. Here the linear carbonate may be at least one selected from the group consisting of ethylene carbonate (EC), propylene carbonate (PC), and butylene carbonate (BC). The cyclic carbonate may be at least one selected from the group consisting of dimethyl carbonate (DMC), diethyl carbonate (DEC) and ethyl methyl carbonate (EMC). In such an aspect, the weight proportion taken up by the propionate ester in the nonaqueous solvent is preferably within a range of 30% by weight to 60% by weight. Note, that in addition to the propionate ester and the linear carbonate and/or cyclic carbonate, the nonaqueous solvent of this aspect may further include decomposition products of the propionate ester, linear carbonate, and cyclic carbonate.

As the electrolyte, for example, lithium salt such as lithium perchlorate ($LiClO_4$), lithium hexafluoro phosphate ($LiPF_6$), lithium tetrafluoro borate ($LiBF_4$), lithium hexafluoro arsenide ($LiAsF_6$), and lithium trifluoromethane sulfonate ($LiCF_3SO_3$) can be cited. As the electrolyte, one electrolyte may be used alone, or there may be used a mixture of two electrolytes or more.

The dissolution amount of the electrolyte with respect to the nonaqueous solvent is desirably 0.5 mol/L to 3 mol/L. If the amount to be dissolved is too high, the electrolyte may not completely dissolve into the electrolyte solution.

In the nonaqueous electrolyte battery according to the first embodiment, the content w of the propionate ester in the nonaqueous electrolyte is 10% by weight to 60% by weight with respect to the weight of the nonaqueous electrolyte. When the propionate ester includes plural species of propionate ester, the content w is a sum of the content [% by weight] of those propionate esters.

(Other Members)

As the container, for example, aluminum, aluminum alloys, iron (Fe), aluminum-containing laminate films, nickel (Ni) plated iron, stainless steel (SUS), and the like may be used.

The positive electrode current collecting tab, the negative electrode current collecting tab, the positive electrode terminal, and the negative electrode terminal are desirably formed from, for example, aluminum or an aluminum alloy.

[Various Measuring Methods]

[Capacity Ratio P/N]

The calculation method for the ratio between capacity p per unit area of the positive electrode and capacity n per unit area of the negative electrode, i.e., the capacity ratio p/n, will be explained below.

First, the nonaqueous electrolyte battery to be examined is provided. The nonaqueous electrolyte battery to be examined is a battery having a capacity of 80% or more of the nominal capacity. The capacity retention ratio of the battery is determined by the following method. First, the battery is charged up to the upper limit of operating voltage. The current value during the charging is a current value corresponding to a 1 C rate determined from the nominal capacity. After the upper limit of operating voltage is reached, the voltage is maintained for three hours. After the charging and maintaining of the voltage, the battery is discharged to the lower limit of operating voltage at 1 C rate. Three cycles of the above charge and discharge is performed in total, and the discharge capacity obtained during discharge for the third cycle is recorded. The ratio of the obtained discharge capacity to the nominal capacity is defined as the capacity retention ratio. Note, the state of charge of the prepared battery may be of any state.

Next, to prevent a reaction of the structural elements of the battery with atmospheric components or moisture when the battery is disassembled, the battery is placed in an inert gas atmosphere like in a glove box of an argon gas atmosphere, for example. Next, the nonaqueous electrolyte battery is opened in such a glove box. For example, the nonaqueous electrolyte battery can be cut opened by cutting heat-sealed portions respectively found near the positive electrode current collecting tab and the negative electrode current collecting tab. The electrode group is taken out from the cut-open nonaqueous electrolyte battery. If the taken-out electrode group includes the positive electrode lead and the negative electrode lead, the positive electrode lead and the negative electrode lead are cut while taking care not to allow the positive and negative electrodes to short-circuit.

Next, the taken-out electrode group is disassembled into the positive electrode, negative electrode, and separator. Subsequently, a portion among the positive electrode active material-containing layer that had been facing the negative electrode active material-containing layer is cut out to obtain a positive electrode fragment. The positive electrode fragment may include the positive electrode current collector supporting the cut-out portion of the positive electrode active material-containing layer. Similarly, a portion among the negative electrode active material-containing layer that had been facing the positive electrode active material-containing layer is cut out to obtain a negative electrode fragment. The negative electrode fragment may include the negative electrode current collector supporting the cut-out portion of the negative electrode active material-containing layer. Thereafter, the positive electrode fragment and negative electrode fragment are washed by a solvent. As the solvent, linear carbonate (dimethyl carbonate, ethyl methyl carbonate, diethyl carbonate, and the like) or acetonitrile may be used. After the washing, the positive electrode fragment and negative electrode fragment are transferred to a depressurizing chamber saturated with an inert gas atmosphere without exposing to air, and the interior of the depressurizing chamber is depressurized. The positive electrode fragment and negative electrode fragment are dried inside the depressurizing chamber. The drying can be performed, for example, in vacuum at 50° C. for 10 hours. Next, the weights of the positive electrode fragment and negative electrode fragment are measured. Thereafter, from the positive electrode fragment, for example, a positive electrode sample of a square with 3 cm sides including the positive electrode active material-containing layer is cut out. Similarly, from the negative electrode fragment, for example, a negative electrode sample of a square with 3 cm sides including the negative electrode active material-containing layer is cut out.

Next, the weight of the cut-out positive electrode sample is measured. After the measurement, a two-electrode or three-electrode electrochemical measuring cell using the positive electrode sample as a working electrode and lithium metal foils for a counter electrode and a reference electrode is fabricated. The fabricated electrochemical measuring cell is charged until the potential of the working electrode reaches 4.25 V (vs. Li/Li). The current value at this time is set to 0.1 mA/cm$^2$. After charging and maintaining voltage, the cell is discharged until the potential of the working electrode becomes 3.0 V (vs. Li/Li$^+$) at the same current value as that used for the charging. Three cycles of the above charge and discharge is performed in total, and the discharge capacity obtained during the third discharge is recorded. The obtained discharge capacity is divided by the area of the positive electrode active material-containing layer configured into the electrochemical measurement cell, i.e., 9 cm$^2$ (=3 cm×3 cm), to thereby obtain the capacity (single electrode capacity) p [mAh/cm$^2$] of the positive electrode per 1 cm$^2$ (per unit area).

On the other hand, the weight of the previously cut-out negative electrode sample is measured. After the measurement, a two-electrode or three-electrode electrochemical measuring cell using the negative electrode sample as a working electrode and lithium metal foils for a counter electrode and a reference electrode is fabricated. The produced electrochemical measurement cell is subjected to charge and discharge of three cycles in total, which is the same as the charge and discharge performed on the electrochemical measurement cell configured with the positive electrode sample, except that the lower limit potential is set to 1.0 V (vs. Li/Li$^+$) and the upper limit potential is set to 3.0 V (vs. Li/Li$^+$). The discharge capacity obtained during the discharge in the third cycle is recorded. The obtained discharge capacity is divided by the area of the negative electrode active material-containing layer configured into the electrochemical measurement cell, i.e., 9 cm$^2$ (=3 cm×3 cm), to thereby obtain the capacity (single electrode capacity) n [mAh/cm$^2$] of the negative electrode per 1 cm$^2$ (per unit area).

The capacity p per unit area of the positive electrode thus obtained is divided by the capacity n per unit area of the negative electrode, to thereby calculate the capacity ratio p/n.

[Identification Method of Positive Electrode Active Material and Negative Electrode Active Material]

The positive electrode active material contained in a nonaqueous electrolyte battery can be identified according to the following method.

First, the nonaqueous electrolyte battery is discharged at 1 C until the battery voltage becomes 1.0 V. The battery put in such a state is disassembled in a glove box filled with argon. The positive electrode is removed from the disassembled battery. The taken-out positive electrode is washed with an appropriate solvent. For example, ethyl methyl carbonate and the like is suitable for use as the solvent. After washing, the positive electrode is subjected to drying under vacuum. After drying, the positive electrode active material containing layer is dislodged from the current collector using a spatula and the like, and the positive electrode active material containing layer is obtained in powder-form.

By performing powder X-ray diffraction measurement on a part of the thus obtained powder, the crystal structure of the compound(s) included in the powder can be identified. The measurement is performed using CuKα ray as X-ray source in the measurement range where 2θ is 10° to 90°. By this measurement, the X-ray diffraction pattern of the compound contained in the powder can be obtained. SmartLab available from Rigaku is used as an apparatus for powder X-ray diffraction measurement. The measurement conditions are as follows: Cu target; 45 kV 200 mA; Soller slit: 5° for both light incidence and light reception; step width: 0.02 deg; scan speed: 20 deg/min; semiconductor detector: D/teX Ultra 250; sample plate holder: flat plate glass sample plate holder (thickness of 0.5 mm); and measurement range: 10°≤2θ≤90°. If another apparatus is used, measurement is performed using standard Si powder for powder X-ray diffraction, a condition where measurement results with the peak intensities, half-widths, and diffraction angles equivalent to results obtained by the above apparatus is found, and measurement is performed under that condition.

The mixing state of the active material can be determined on whether there is appearance of peaks that can be assigned to plural crystal structures in the measurement results, or not.

Subsequently, the active material-containing layer is observed with a scanning electron microscope (SEM) equipped with an energy dispersive X-ray spectroscopy (EDX) apparatus (SEM-EDX). Sampling of the sample is also performed avoiding contact with air, in an inert atmosphere such as that of argon or nitrogen. In a SEM observation image at 3000 times magnification, several particles having the forms of primary or secondary particles examined within the field of view are selected. Whereupon, the particles are selected such that the particle size distribution of the selected particles is spread widely as possible. For the active material particles that could be observed, the species of the constituent elements and composition of the active material are specified by EDX. Accordingly, the species and amounts of the elements other than Li among the elements contained in the selected particles can be specified. Similar operations are performed for each of the plural active material particles, thereby judging the state of mixing of the active material particles.

Subsequently, another portion of the powder of the positive electrode active material-containing layer is washed with acetone, dried, and weighed out. The weighed out powder is dissolved with hydrochloric acid, and the electro-conductive agent is removed by filtration, to obtain a filtrate. The filtrate is then diluted with ion exchange water to obtain a measurement sample. The measurement sample is subjected to analysis by inductively coupled plasma atomic emission spectroscopy (ICP-AES) to calculate the amount of metal element contained in the measurement sample. If plural species of active materials are present, their weight ratio is estimated from the content ratio of elements unique to each active material.

The unique elements and ratio of active material weight is judged from the composition of the constituent elements determined by energy dispersive X-ray spectroscopy. From the determined ratio of metal elements, the chemical formula and stoichiometric amounts can be calculated, respectively for the lithium manganese composite oxide having the spinel crystal structure and lithium cobaltate. From the results, the content A [weight %] of the lithium manganese composite oxide having the spinel crystal structure and content B [weight %] of the lithium cobaltate included in the weighed out powder of positive electrode active material-containing layer can be determined.

The negative electrode active material included in the nonaqueous electrolyte battery can also be identified according to the same procedure as that described above. However, in order to determine the crystal state of the negative electrode active material, lithium ions are released from the active material to be measured. For example, the nonaqueous electrolyte battery is discharged at 1 C until the battery voltage becomes 1.0 V. Even when the battery is discharged, however, lithium ions may remain in the active material.

[Method of Measuring Average Particle Size of Active Material]

First, the positive electrode is extracted from the nonaqueous electrolyte battery to be measured, according to the same procedure as the procedure performed when identifying the positive electrode active material. Next, the positive electrode active material-containing layer in powder form is obtained from the extracted positive electrode according to the same procedure as the procedure performed when identifying the positive electrode active material. Then, the active material-containing layer in powder form is analyzed using the X-ray diffraction measurement and the SEM-EDX described above to examine the presence of the active material particles to be measured. A transmission electron microscope (TEM) with EDX (TEM-EDX) may be used instead of the SEM-EDX.

The magnification of the SEM observation is desirably about 5,000 times. When the particle morphology is difficult to determine due to an additive such as an electro-conductive agent, an SEM equipped with a focused ion beam (FIB) (FIB-SEM), for example, is used to obtain an image of a cross section of the active-material-containing layer, and the obtained image is observed. The magnification is adjusted so that an image including 50 or more particles is obtained.

Then, the particle sizes of all the particles included in the obtained image are measured. In regard to the particles in the form of a secondary particle, the particle size of the secondary particle is measured as a particle size of a single particle. If a particle has a spherical shape, the diameter of the spherical shape is determined to be the particle size. If a particle has a non-spherical shape, first, the length of the smallest span of the particle and the length of the largest span of the same particle are measured. The average value of these lengths is determined as the particle size.

[Method of Identifying Components of Nonaqueous Solvent Included in Nonaqueous Electrolyte]

A method of identifying components of a solvent included in the nonaqueous electrolyte will be described below.

First, the nonaqueous electrolyte battery to be measured is discharged at 1 C until the battery voltage becomes 1.0 V. The discharged nonaqueous electrolyte battery is disassembled inside a glove box in an inert atmosphere.

Then, the nonaqueous electrolyte included in the battery and the electrode group is extracted. If the nonaqueous electrolyte can be extracted from the unsealed part of the nonaqueous electrolyte battery, sampling of the nonaqueous electrolyte is performed as is. On the other hand, if the nonaqueous electrolyte is held in the electrode group, the electrode group is further disassembled, and the separator impregnated with the nonaqueous electrolyte, for example, is extracted. The nonaqueous electrolyte impregnated into the separator can be extracted by using a centrifuge separator or the like. Thereby, sampling of the nonaqueous electrolyte can be performed. If the amount of the nonaqueous electrolyte included in the nonaqueous electrolyte battery is small, the nonaqueous electrolyte can also be extracted by immersing the electrodes and the separator in an acetonitrile solution. The weight of the acetonitrile solution is measured before and after the extraction, so that the extraction amount can be calculated.

A sample of the nonaqueous electrolyte thus obtained is subjected to a gas chromatography mass spectrometer (GC-MS) or nuclear magnetic resonance spectroscopy (NMR) to perform a composition analysis. In the analysis, the species of propionate ester included in the nonaqueous electrolyte is identified first. A calibration curve of the propionate ester included in the nonaqueous electrolyte is then made. If multiple species of propionate esters are included in the nonaqueous electrolyte, a calibration curve for each ester is made. A mixing ratio of the propionate ester(s) in the nonaqueous electrolyte can be calculated by comparing the calibration curve made and the peak intensity or area shown in the results obtained by measuring the sample of the nonaqueous electrolyte.

Figure 2:
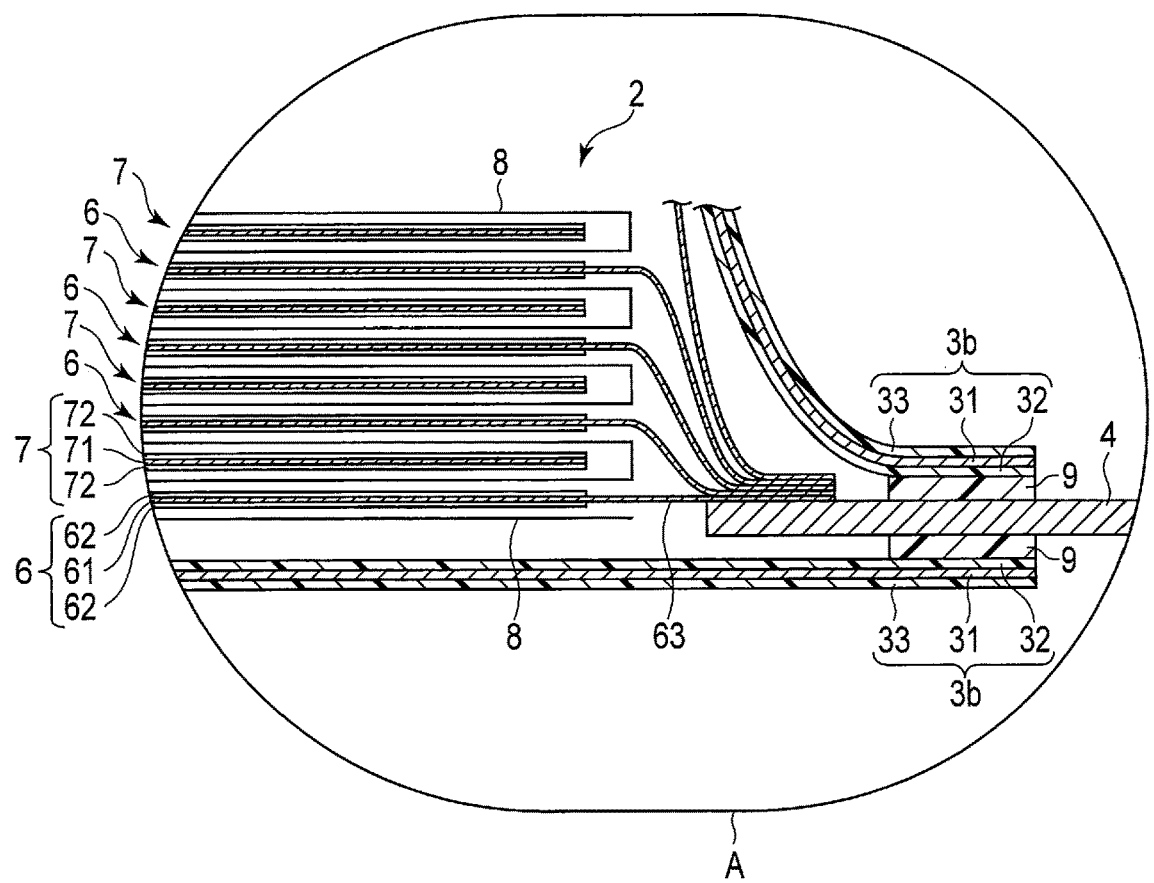
FIG. 2 is a schematic cross-sectional view of section A in FIG. 1.

Next, one example of the nonaqueous electrolyte battery according to the first embodiment is explained in more detail, with reference to FIGS. 1 to 3.

FIG. 1 is a schematic cut-out perspective view showing one example of the nonaqueous electrolyte battery according to the first embodiment. FIG. 2 is a schematic cross-sectional view of section A shown in FIG. 1. FIG. 3 is a schematic plan view showing one example of a positive electrode included in the nonaqueous electrolyte battery according to the first embodiment.

The nonaqueous electrolyte battery 1 of a first example, shown in FIGS. 1 to 3, includes an electrode group 2 shown in FIGS. 1 and 2, a container 3 shown in FIGS. 1 and 2, a positive electrode current collecting tab 4 shown in FIGS. 1 and 2, and a negative electrode current collecting tab 5 shown in FIG. 1.

The electrode group 2 shown in FIGS. 1 and 2 includes plural positive electrodes 6, plural negative electrodes 7, and one separator 8.

The positive electrodes 6 include a positive electrode current collector 61 and positive electrode active material-including layers 62 formed on both sides of the positive electrode current collector 61, as shown in FIGS. 2 and 3. As shown in FIGS. 2 and 3, the positive electrode current collector 61 includes a portion 63 where the positive electrode active material-including layers 62 are not formed on a surface thereof. This portion 63 serves as a positive electrode lead. As shown in FIG. 3, the positive electrode lead 63 is a narrow portion whose width is narrower than that of the positive electrode active material-including layer 62.

The negative electrodes 7 include a negative electrode current collector 71, and negative electrode active material-including layers 72 formed on both sides of the negative electrode current collector 71, as shown in FIG. 2. Although not shown, the negative electrode current collector 71 includes a portion where the negative electrode active material-including layer 72 is not formed on a surface thereof. This portion serves as the negative electrode lead.

As indicated by a part thereof shown in FIG. 2, the separator 8 is folded in zigzag. In each of spaces defined by surfaces facing each other of the separator 8 folded in zigzag, each of the positive electrodes 6 and the negative electrodes 7 are arranged. Accordingly, the positive electrodes 6 and the negative electrodes 7 are stacked in such a manner that positive electrode active material-including layers 62 and negative electrode active material-including layers 72 face each other through the separator 8 sandwiched therebetween, as shown in FIG. 2. Thus, the electrode group 2 is formed.

The positive electrode leads 63 of the electrode group 2 extend out from the electrode group 2, as shown in FIG. 2. The positive electrode leads 63 are collected together into one, and connected to the positive electrode current collecting tab 4, as shown in FIG. 2. Although not shown, the negative electrode leads of the electrode group 2 also extend out from the electrode group 2. Although not shown, the negative electrode leads are collected together into one, and connected to the negative electrode current collecting tab 5 shown in FIG. 1.

Such an electrode group 2 is housed in a container 3, as shown in FIGS. 2 and 3.

The container 3 is formed of an aluminum-containing laminate film including an aluminum foil 31 and resin films 32 and 33 formed on the both sides thereof. The aluminum-containing laminate film forming the container 3 is folded with a fold section 3d as the fold so that the resin film 32 faces inward, and houses the electrode group 2. As shown in FIGS. 1 and 2, portions of the resin films 32 facing each other sandwich the positive electrode current collecting tab 4 therebetween, at the periphery 3b of the container 3. Similarly, portions of the resin films 32 facing each other sandwich the negative electrode current collecting tab 5 therebetween, at the periphery 3c of the container 3. The positive electrode current collecting tab 4 and the negative electrode current collecting tab 5 extend out from the container 3 in opposite directions to each other.

Portions of the resin films 32 facing each other are thermally fused at the peripheries 3a, 3b and 3c of the container 3, except at portions where the positive electrode current collecting tab 4 and the negative electrode current collecting tab 5 are sandwiched therebetween.

In the nonaqueous electrolyte battery 1, in order to improve bonding strength between the positive electrode current collecting tab 4 and the resin films 32, insulating films 9 are provided between the positive electrode current collecting tab 4 and the resin films 32, as shown in FIG. 2. In the periphery 3b, the positive electrode current collecting tab 4 and insulating films 9 are thermally fused, and the resin films 32 and the insulating film 9 are thermally fused. Similarly, although not shown, insulating films 9 are also provided between the negative electrode current collecting tab 5 and the resin films 32. In the periphery 3c, the negative electrode current collecting tab 5 and the insulating films 9 are thermally fused, and the resin films 32 and the insulating films 9 are thermally fused. Namely, in the nonaqueous electrolyte battery 1 shown in FIGS. 1 to 3, all of the peripheries 3a, 3b and 3c of the container 3 are heat-sealed.

The container 3 further houses a nonaqueous electrolyte, which is not shown. The nonaqueous electrolyte is permeated into the electrode group 2.

In the nonaqueous electrolyte battery 1 shown in FIGS. 1 to 3, the plural positive electrode leads 63 are collected together at the undermost layer of the electrode group 2, as shown in FIG. 2. Similarly, although not shown, the plural negative electrode leads are collected together at the undermost layer of the electrode group 2. The plural positive electrode leads 63 and the plural negative electrode leads 73 may, however, be respectively collected together into one near a middle section of the electrode group 2, and connected to the positive electrode current collecting tab 4 and the negative electrode current collecting tab 5, respectively, as shown in FIG. 4, for example.

According to a first embodiment, a nonaqueous electrolyte battery is provided. The nonaqueous electrolyte battery includes a positive electrode, a negative electrode, and a nonaqueous electrolyte. The positive electrode includes a positive electrode active material-containing layer. The positive electrode active material-containing layer contains lithium manganese composite oxide particles having a spinel crystal structure and lithium cobalt composite oxide particles. The negative electrode includes a titanium-containing oxide. The nonaqueous electrolyte contains a propionate ester. The battery satisfies the equations: $0.8 \leq p/n \leq 1.2$; and $1 \leq w/s \leq 60$. A content w of the propionate ester in the nonaqueous electrolyte is within a range of 10% by weight to 60% by weight. The nonaqueous electrolyte battery can suppress elution of manganese from the lithium manganese composite oxide and decomposition of the nonaqueous electrolyte on a surface of the positive electrode active material-containing layer, while maintaining a low resistance value. As a result, the nonaqueous electrolyte battery according to the first embodiment can exhibit a low resistance value and suppress gas generation.

Second Embodiment

According to a second embodiment, a battery pack is provided. This battery pack includes the nonaqueous electrolyte battery according to the first embodiment.

The battery pack according to the second embodiment may include plural nonaqueous electrolyte batteries. The plural nonaqueous electrolyte batteries may be electrically connected in series or electrically connected in parallel. Alternatively, plural nonaqueous electrolyte batteries may be connected in a combination of in-series and in-parallel.

For example, the battery pack according to the second embodiment may be provided with five nonaqueous electrolyte batteries according to the first embodiment. These nonaqueous electrolyte batteries may be connected in series, for example.

Further, the nonaqueous electrolyte batteries connected in series may constitute a battery module. That is, the battery pack according to the second embodiment may include a battery module, also.

The battery pack according to the second embodiment may include plural battery modules. The plural battery modules may be connected in series, in parallel, or in combination of in-series and in-parallel.

Hereinafter, an example of a battery pack according to the second embodiment will be described with reference to FIGS. 5 and 6.

FIG. 5 is an exploded perspective view of an example of the battery pack according to the second embodiment. FIG. 6 is a block diagram showing an electric circuit of the battery pack shown in FIG. 5.

Figure 6:
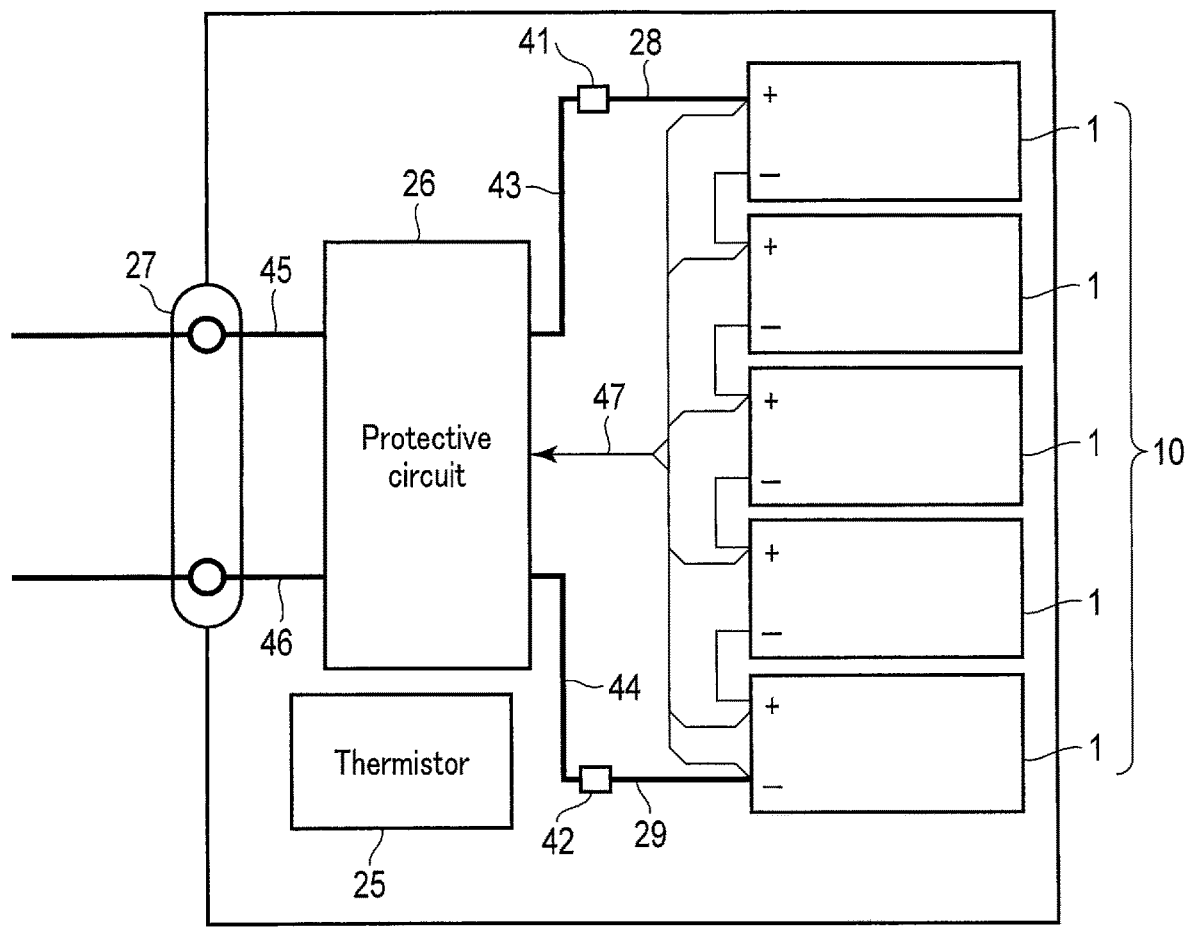
FIG. 6 is a block diagram showing an electric circuit of the battery pack shown in FIG. 5.

The battery pack 20 shown in FIGS. 5 and 6 includes plural single-batteries 1. The single-battery 1 is the exemplar flat nonaqueous electrolyte battery according to the first embodiment. The single-battery 1 includes an electrode group not shown, a nonaqueous electrolyte not shown, a container 3 shown in FIG. 5, and a positive electrode terminal 11 and a negative electrode terminal 12 shown in FIG. 5. The electrode group and nonaqueous electrolyte are housed in the container 3. The electrode group is impregnated with the nonaqueous electrolyte.

The container 3 has a shape of a bottomed square cylinder. The container 3 is formed, for example, of a metal such as aluminum, aluminum alloy, iron, or stainless steel.

The electrode group includes a positive electrode, a negative electrode, and a separator, in a similar manner as the electrode group included in the nonaqueous electrolyte battery described with reference to FIGS. 1 to 3.

The positive electrode terminal 11 is electrically connected to the positive electrode. The negative electrode 12 is electrically connected to the negative electrode. Each of, one end of the positive electrode terminal 11 and one end of the negative electrode terminal 12 extend out from the same end face of the single-battery 1.

The plural single-batteries 1 are stacked in such manner that the externally extending positive electrode terminals 11 and negative electrode terminals 12 are aligned in the same direction, and are fastened with an adhesive tape 22 to constitute a battery module 10. These single-batteries 1 are electrically connected in series to each other as shown in FIG. 6.

A printed wiring board 24 is disposed facing the end surface from which the negative electrode terminals 12 and the positive electrode terminals 11 of the single-batteries 1 extend. As shown in FIG. 6, the printed wiring board 24 is mounted with a thermistor 25, a protective circuit 26, and an external power distribution terminal 27. Note that an insulating plate (not shown) is attached to the surface of the printed wiring board 24 which faces the battery module 10 so as to avoid unnecessary connection with the wiring of the battery module 10.

A positive electrode-side lead 28 is connected to the positive electrode terminal 11 located lowermost in the battery module 10, and a distal end thereof is inserted into a positive electrode-side connector 41 of the printed wiring board 24 and electrically connected thereto. A negative electrode-side lead 29 is connected to the negative electrode terminal 12 located uppermost in the battery module 10, and a distal end thereof is inserted into the negative electrode-side connector 42 of the printed wiring board 24 and electrically connected thereto. These connectors 41 and 42 are connected to the protective circuit 26 through wirings 43 and 44 formed on the printed wiring board 24.

The thermistor 25 detects the temperature of the single-batteries 1, and the detection signal is transmitted to the protective circuit 26. The protective circuit 26 can shut off a plus-side wiring 45 and a minus-side wiring 46 between the protective circuit 26 and the external power distribution terminal 27 under a predetermined condition. An example of the predetermined condition is, for example, when the temperature detected by the thermistor 25 becomes a predetermined temperature or higher. Further, another example of the predetermined condition is, for example, when overcharge, over-discharge, overcurrent, or the like of the single-battery(s) 1 is detected. Detection of this overcharge or the like is performed for each of the individual single-batteries 1 or the entire battery module 10. In the case of detecting each single-battery 1, a battery voltage may be detected, or a positive electrode potential or a negative electrode potential may be detected. In the latter case, a lithium electrode used as a reference electrode is inserted into each single-battery 1. In the case of the battery pack 20 of FIG. 5 and FIG. 6, wiring 47 for voltage detection is connected to each of the single-batteries 1. Detection signals are transmitted to the protective circuit 26 through the wirings 47.

Protective sheets 91 made of rubber or resin are respectively arranged on three side surfaces of the battery module 10 excluding the side surface from which the positive electrode terminal 11 and the negative electrode terminal 12 protrude.

The battery module 10 is housed in a housing container 100 together with each protective sheet 91 and the printed wiring board 24. That is, the protective sheets 91 are disposed in the housing container 100 respectively on both inner side surfaces along a long-side direction and the inner side surface along a short-side direction, and the printed wiring board 24 is disposed on the inner side surface at the opposite side along the short-side direction. The battery module 10 is located in a space surrounded by the protective sheets 91 and the printed wiring board 24. A lid 110 is attached to the upper surface of the housing container 100.

For fixing the battery module 10, a thermal shrinkage tape may be used in place of the adhesive tape 22. In this case, the protective sheets are disposed on each side surface of the battery module 10, a thermal shrinkage tape is wound, and thereafter, the thermal shrinkage tape is thermally shrunk to bind the battery module 10.

In FIGS. 5 and 6, the single-batteries 1 are connected in series. On the other hand, the single-batteries 1 may be connected in parallel in order to increase the battery capacity. Further, assembled battery packs may also be connected in series and/or parallel.

Moreover, the mode of the battery pack according to the second embodiment is appropriately changed depending on the application. A preferable application of the battery pack according to the second embodiment is one where favorable cycle performance is desired along with favorable large current performance. Specific examples of the applications include that for a power source of a digital camera, and for onboard use such as on a two-wheeled or four-wheeled hybrid electric automobile, a two-wheeled or four-wheeled electric automobile, and a power-assisted bicycle. In particular, the battery pack according to the second embodiment is favorable for onboard use.

Since the battery pack according to the second embodiment is provided with the nonaqueous electrolyte battery according to the first embodiment, the battery pack can exhibit a low resistance value and suppress gas generation.

EXAMPLES

Hereinafter, the above embodiments will be described in more detail based on examples. The examples will be described below; however, the present invention is not limited to the examples described below, so long as the present invention does not deviate from the scope and spirit thereof.

Example 1

In Example 1, a nonaqueous electrolyte battery was produced according to the procedure described below.

[Production of Positive Electrode]

As positive electrode active material, particles of aluminum-containing lithium manganese composite oxide ($LiAl_{0.25}Mn_{0.75}O_4$) having a spinel crystal structure and particles of lithium cobaltate ($LiCoO_2$), which were commercially available, were prepared. The aluminum-containing lithium manganese composite oxide particles were a mixture containing primary particles and secondary particles formed by agglomeration of primary particles. The average particle size s of the aluminum-containing lithium manganese composite oxide particles was 5 µm. The lithium cobaltate particles were primary particles. The average primary particle size t of the lithium cobaltate particles was 8 µm. These particles were mixed so that the weight ratio aluminum-containing lithium manganese composite oxide: lithium cobaltate was 92:8, and the resulting mixture was used as positive electrode active material.

Acetylene black was prepared as an electro-conductive agent. Polyvinylidene fluoride (PVdF) was prepared as a binder.

The positive electrode active material, acetylene black, and PVdF were mixed at a ratio of 85% by weight, 10% by weight, and 5.0% by weight, respectively, to obtain a mixture thereof. N-methyl pyrrolidone was added to the mixture, followed by mixing, to prepare a slurry. This slurry was coated onto both surfaces of a belt-shaped current collector made of an aluminum foil having a thickness of 20 µm, to thereby obtain a coat. The coat was dried. The applied amount of the slurry was adjusted so that the weight per 1 $m^2$ of the coat applied onto each surface was 90 $g/m^2$ after drying. Then, the coat was subjected to roll pressing together with the current collector to obtain a belt-shaped electrode. The density of the coat after the roll pressing was 3.0 $g/cm^3$.

Next, from the belt-shaped electrode, a part of the aluminum foil that was not coated with the slurry was punched out, to form positive electrode leads. Then, plural strip-shaped positive electrodes having a planar shape similar to that shown in FIG. 3 were cut out from the belt-shaped electrode. Each of the positive electrodes included a positive electrode current collector and a positive electrode active material-containing layer formed on both surfaces of the positive electrode current collector.

[Production of Negative Electrode]

First, a powder of lithium titanium oxide having a spinel crystal structure ($Li_4Ti_5O_{12}$) was prepared as negative electrode active material. Acetylene black was prepared as an electro-conductive agent. Polyvinylidene fluoride (PVdF) was prepared as a binder. The negative electrode active material, acetylene black, and PVdF were mixed at a proportion of 85% by weight, 10% by weight, and 5.0% by weight, respectively, to obtain a mixture thereof. N-methyl pyrrolidone was added to the mixture, followed by mixing, to prepare a slurry. This slurry was coated onto both surfaces of a belt-shaped current collector made of aluminum foil having a thickness of 20 µm, to thereby obtain a coat. The coat was dried. The applied amount of the slurry was adjusted so that the weight per 1 $m^2$ of the coat applied onto each surface was 50 $g/m^2$ after drying. Then, the coat was subjected to roll pressing together with the current collector to obtain a belt-shaped electrode. The density of the coat after the roll pressing was 2.4 $g/cm^3$.

Next, from the belt-shaped electrode, a part of the aluminum foil that was not coated with the slurry was punched out, to form negative electrode leads. Then, plural strip-shaped positive electrodes having a planar shape similar to that of the positive electrodes were cut out from the belt-shaped electrode. Each of the negative electrodes included a negative electrode current collector and a negative electrode active material-containing layer formed on both surfaces of the negative electrode current collector.

[Production of Electrode Group]

A belt-shaped microporous film separator having a thickness of 30 µm was prepared. The separator was folded n zigzag. Subsequently, the positive electrodes and negative electrodes were alternately inserted into the spaces defined by faces of the zigzag folded separator facing each other, to obtain a stack. Finally, the obtained stack was secured with a tape for keeping the stack intact, to obtain an electrode group. The electrode area and stacking number were adjusted such that the discharge capacity of the electrode group was 3.0 Ah.

[Connection of Positive Electrode Current Collecting Tab and Negative Electrode Current Collecting Tab to Electrode Group]

A positive electrode current collecting tab and a negative electrode current collecting tab were fabricated using aluminum. Subsequently, the positive electrode leads of the plural positive electrodes were collected together into one and connected to the positive electrode current collecting tab. Similarly, the negative electrode leads of the plural negative electrodes were collected together into one and connected to the negative electrode current collecting tab. As such, the positive electrode current collecting tab and the negative electrode current collecting tab were implemented in such a manner that they extend out from the electrode group in opposite directions from each other, so that collection of power from the positive electrode and the negative electrode can be performed easily.

[Production of Container]

As the container, an aluminum-containing laminate film was used. First, the aluminum-containing laminate film was fabricated into a shape capable of housing the above electrode group. The electrode group was housed in the thus fabricated aluminum-containing laminate film as described above with reference to FIGS. 1 and 2. Whereupon, as described with reference to FIG. 2, the positive electrode current collecting tab was put between portions of resin films facing one another at one periphery (periphery 3b in FIG. 2) of the container. Similarly, the negative electrode current collecting tab was put between portions of resin films facing one another at another periphery of the container, although not shown even in FIG. 2. Insulating films were disposed between the positive electrode current collecting tab and the resin films, and between the negative electrode current collecting tab and the resin films.

Subsequently, portions of the resin films facing each other at the peripheries were fixed by thermal fusion, leaving a part left unsealed. At the same time, at one periphery, a part of the resin film and the insulating film facing the resin film were fixed by the thermal fusion, and the positive electrode current collecting tab and the insulating films facing the positive electrode current collecting tab were fixed by the thermal fusion. Similarly, at one periphery, the resin film and the insulating film facing the resin film were fixed by the thermal fusion, and the negative electrode current collecting tab and the insulating films facing the negative electrode current collecting tab were fixed by the thermal fusion. Thus, a pre-fluid-poured cell was produced.

[Production of Nonaqueous Electrolyte]

A nonaqueous electrolyte was prepared according to the procedure described below.

First, propylene carbonate and ethyl propionate were prepared as nonaqueous solvents. As an electrolyte, lithium hexafluorophosphate ($LiPF_6$) was prepared. These materials were mixed so that the mixing ratio of propylene carbonate: ethyl propionate:$LiPF_6$ was 50% by weight: 40% by weight: 10% by weight. Thereby, a nonaqueous electrolyte was prepared. The content w of ethyl propionate in the nonaqueous electrolyte was 40% by weight with respect to the weight of the nonaqueous electrolyte.

[Production of Nonaqueous Electrolyte Battery]

The prepared nonaqueous electrolyte was poured into the pre-fluid-poured cell housing the electrode group, to thereby produce a nonaqueous electrolyte battery.

Examples 2 and 3

Each of the nonaqueous electrolyte batteries were produced according to the same procedure as in Example 1, except that methyl propionate (Example 2) and propyl propionate (Example 3) were respectively used instead of ethyl propionate as the propionate ester.

Examples 4 and 5

Each of the nonaqueous electrolyte batteries were produced according to the same procedure as in Example 1, except that when producing the positive electrode, the applied amount of the slurry was adjusted so that the weight per 1 $m^2$ of the coat applied on each surface was 105 $g/m^2$ (Example 4) and 70 $g/m^2$ (Example 5), respectively, after drying.

Examples 6 and 7

Each of the nonaqueous electrolyte batteries were produced according to the same procedure as in Example 1, except that the content w of ethyl propionate in the nonaqueous electrolyte was changed as shown in Table 2 below.

Examples 8 to 13

Each of the nonaqueous electrolyte batteries were produced according to the same procedure as in Example 1, except for the points below.

In Examples 8 to 10, particles of aluminum-containing lithium manganese composite oxide ($LiAl_{0.25}Mn_{1.75}O_4$) having an average particle size s of 1 μm were used as the lithium-manganese composite oxide particles having a spinel crystal structure. Also, in Examples 8 to 10, particles of lithium cobaltate ($LiCoO_2$) having an average primary particle size t of 4 μm were used as the lithium cobalt composite oxide particles.

In Examples 11 to 13, particles of aluminum-containing lithium manganese composite oxide ($LiAl_{0.25}Mn_{1.75}O_4$) having an average particle size s of 10 μm were used as the lithium-manganese composite oxide particles having a spinel crystal structure.

In Examples 8, 10, 11, and 13, the content w of ethyl propionate in the nonaqueous electrolyte was changed as shown in Table 2 below.

Examples 14 to 16

Each of the nonaqueous electrolyte batteries were produced according to the same procedure as in Example 1, except that the lithium manganese composite oxide particles having a spinel crystal structure and the lithium cobaltate particles were mixed at the weight ratio shown in Table 1 below.

Examples 17 to 21

Each of the nonaqueous electrolyte batteries were produced according to the same procedure as in Example 1, except that the particles of composite oxides having the compositions shown in Table 1 below were used as the lithium manganese composite oxide particles having a spinel crystal structure.

Examples 22 and 23

Each of the nonaqueous electrolyte batteries were produced according to the same procedure as in Example 1, except for the points below.

In Example 22, a powder of niobium titanium composite oxide ($TiNb_2O_7$) having a monoclinic crystal structure was used as the negative electrode active material.

In Example 23, a powder of Na-containing niobium titanium composite oxide ($Li_2Na_{1.8}Nb_{0.2}Ti_{5.8}O_{14}$) having an orthorhombic crystal structure was used as the negative electrode active material.

When producing the negative electrode, the applied amount of the slurry was adjusted so that the weight per 1 $m^2$ of the coat applied on each surface was 40 $g/m^2$ (Example 22) and 70 $g/m^2$ (Example 23), respectively, after drying.

Tables 1 and 2 below summarize the materials and conditions employed to produce the nonaqueous electrolyte batteries of Examples 1 to 23.

TABLE 1

| | Positive Electrode Active Material | | | | | Applied Amount for Positive Electrode [g/m²] |
|---|---|---|---|---|---|---|
| | Lithium Manganese Composite Oxide [LMO] | | Lithium Cobalt Composite Oxide [LCO] | | | |
| | Composition | Average Particle Size s [μm] | Composition | Average Particle Size t [μm] | Weight Ratio [LMO:LCO] | |
| Example 1 | $LiAl_{0.25}Mn_{1.75}O_4$ | 5 | $LiCoO_2$ | 8 | 92:8 | 90 |
| Example 2 | $LiAl_{0.25}Mn_{1.75}O_4$ | 5 | $LiCoO_2$ | 8 | 92:8 | 90 |
| Example 3 | $LiAl_{0.25}Mn_{1.75}O_4$ | 5 | $LiCoO_2$ | 8 | 92:8 | 90 |
| Example 4 | $LiAl_{0.25}Mn_{1.75}O_4$ | 5 | $LiCoO_2$ | 8 | 92:8 | 105 |
| Example 5 | $LiAl_{0.25}Mn_{1.75}O_4$ | 5 | $LiCoO_2$ | 8 | 92:8 | 70 |
| Example 6 | $LiAl_{0.25}Mn_{1.75}O_4$ | 5 | $LiCoO_2$ | 8 | 92:8 | 90 |
| Example 7 | $LiAl_{0.25}Mn_{1.75}O_4$ | 5 | $LiCoO_2$ | 8 | 92:8 | 90 |
| Example 8 | $LiAl_{0.25}Mn_{1.75}O_4$ | 1 | $LiCoO_2$ | 4 | 92:8 | 90 |
| Example 9 | $LiAl_{0.25}Mn_{1.75}O_4$ | 1 | $LiCoO_2$ | 4 | 92:8 | 90 |
| Example 10 | $LiAl_{0.25}Mn_{1.75}O_4$ | 1 | $LiCoO_2$ | 4 | 92:8 | 90 |
| Example 11 | $LiAl_{0.25}Mn_{1.75}O_4$ | 10 | $LiCoO_2$ | 8 | 92:8 | 90 |
| Example 12 | $LiAl_{0.25}Mn_{1.75}O_4$ | 10 | $LiCoO_2$ | 8 | 92:8 | 90 |
| Example 13 | $LiAl_{0.25}Mn_{1.75}O_4$ | 10 | $LiCoO_2$ | 8 | 92:8 | 90 |
| Example 14 | $LiAl_{0.25}Mn_{1.75}O_4$ | 5 | $LiCoO_2$ | 8 | 99:1 | 90 |
| Example 15 | $LiAl_{0.25}Mn_{1.75}O_4$ | 5 | $LiCoO_2$ | 8 | 96:4 | 90 |
| Example 16 | $LiAl_{0.25}Mn_{1.75}O_4$ | 5 | $LiCoO_2$ | 8 | 90:10 | 90 |
| Example 17 | $LiLi_{0.25}Mn_{1.75}O_4$ | 5 | $LiCoO_2$ | 8 | 92:8 | 90 |
| Example 18 | $LiMg_{0.3}Mn_{1.7}O_4$ | 5 | $LiCoO_2$ | 8 | 92:8 | 90 |
| Example 19 | $LiTi_{0.25}Mn_{1.75}O_4$ | 5 | $LiCoO_2$ | 8 | 92:8 | 90 |
| Example 20 | $LiFe_{0.25}Mn_{1.75}O_4$ | 5 | $LiCoO_2$ | 8 | 92:8 | 90 |
| Example 21 | $LiZn_{0.25}Mn_{1.75}O_4$ | 5 | $LiCoO_2$ | 8 | 92:8 | 90 |
| Example 22 | $LiAl_{0.25}Mn_{1.75}O_4$ | 5 | $LiCoO_2$ | 8 | 92:8 | 90 |
| Example 23 | $LiAl_{0.25}Mn_{1.75}O_4$ | 5 | $LiCoO_2$ | 8 | 92:8 | 90 |

TABLE 2

| | Negative Electrode Active Material | | Propionate Ester | |
|---|---|---|---|---|
| | Composition | Applied Amount For Negative Electrode [g/m²] | Species | Content w [% by weight] |
| Example 1 | $Li_4Ti_5O_{12}$ | 50 | Ethyl Propionate | 40 |
| Example 2 | $Li_4Ti_5O_{12}$ | 50 | Methyl Propionate | 40 |
| Example 3 | $Li_4Ti_5O_{12}$ | 50 | Propyl Propionate | 40 |
| Example 4 | $Li_4Ti_5O_{12}$ | 50 | Ethyl Propionate | 40 |
| Example 5 | $Li_4Ti_5O_{12}$ | 50 | Ethyl Propionate | 40 |
| Example 6 | $Li_4Ti_5O_{12}$ | 50 | Ethyl Propionate | 10 |
| Example 7 | $Li_4Ti_5O_{12}$ | 50 | Ethyl Propionate | 60 |
| Example 8 | $Li_4Ti_5O_{12}$ | 50 | Ethyl Propionate | 10 |
| Example 9 | $Li_4Ti_5O_{12}$ | 50 | Ethyl Propionate | 40 |
| Example 10 | $Li_4Ti_5O_{12}$ | 50 | Ethyl Propionate | 60 |
| Example 11 | $Li_4Ti_5O_{12}$ | 50 | Ethyl Propionate | 10 |
| Example 12 | $Li_4Ti_5O_{12}$ | 50 | Ethyl Propionate | 40 |
| Example 13 | $Li_4Ti_5O_{12}$ | 50 | Ethyl Propionate | 60 |
| Example 14 | $Li_4Ti_5O_{12}$ | 50 | Ethyl Propionate | 40 |
| Example 15 | $Li_4Ti_5O_{12}$ | 50 | Ethyl Propionate | 40 |
| Example 16 | $Li_4Ti_5O_{12}$ | 50 | Ethyl Propionate | 40 |
| Example 17 | $Li_4Ti_5O_{12}$ | 50 | Ethyl Propionate | 40 |
| Example 18 | $Li_4Ti_5O_{12}$ | 50 | Ethyl Propionate | 40 |
| Example 19 | $Li_4Ti_5O_{12}$ | 50 | Ethyl Propionate | 40 |
| Example 20 | $Li_4Ti_5O_{12}$ | 50 | Ethyl Propionate | 40 |
| Example 21 | $Li_4Ti_5O_{12}$ | 50 | Ethyl Propionate | 40 |
| Example 22 | $TiNb_2O_7$ | 40 | Ethyl Propionate | 40 |
| Example 23 | $Li_2Na_{1.8}Nb_{0.2}Ti_{5.8}O_{14}$ | 70 | Ethyl Propionate | 40 |

Comparative Example 1

A nonaqueous electrolyte battery was produced according to the same procedure as in Example 1, except that diethyl carbonate (DEC) was used instead of ethyl propionate. The content of diethyl carbonate in the nonaqueous electrolyte was 40% by weight.

Comparative Examples 2 and 3

Each of the nonaqueous electrolyte batteries were produced according to the same procedure as in Example 1, except that when producing the positive electrode, the applied amount of the slurry was adjusted so that the weight per 1 m$^2$ of the coat applied on each surface was 115 g/m$^2$ (Comparative Example 2) and 60 g/m$^2$ (Comparative Example 3), respectively, after drying.

Comparative Example 4

A nonaqueous electrolyte battery was produced according to the same procedure as in Example 1, except for the points below.
Particles of aluminum-containing lithium manganese composite oxide (LiAl$_{0.2}$Mn$_{1.8}$O$_4$) having an average particle size s of 20 μm were used as the lithium-manganese composite oxide particles having a spinel crystal structure.
The content w of ethyl propionate in the nonaqueous electrolyte was changed to 15% by weight.

Comparative Example 5

A nonaqueous electrolyte battery was produced according to the same procedure as in Example 1, except for the points below.
Particles of aluminum-containing lithium manganese composite oxide (LiAl$_{0.2}$Mn$_{1.8}$O$_4$). having an average particle size s of 0.6 μm were used as the lithium manganese composite oxide particles having a spinel crystal structure. Also, particles of lithium cobaltate (LiCoO$_2$) having an average primary particle size t of 3 μm were used as the lithium cobalt composite oxide particles.

Comparative Examples 6 and 7

Each of the nonaqueous electrolyte batteries were produced according to the same procedure as in Example 1, except that the content w of propionate ester in the nonaqueous electrolyte was changed to the values shown in Table 4 below.

Comparative Example 8

A nonaqueous electrolyte battery was produced according to the same procedure as in Example 1, except for the points below.
First, the lithium manganese composite oxide particles having a spinel crystal structure were not used.
When producing the positive electrode, the applied amount of the slurry was adjusted so that the weight per 1 m$^2$ of the coat applied on each surface was 58 g/m$^2$ after drying.

Comparative Example 9

A nonaqueous electrolyte battery was produced according to the same procedure as in Example 1, except that the lithium cobaltate particles were not used.

Comparative Example 10

A nonaqueous electrolyte battery was produced according to the same procedure as in Example 1, except for the points below.
First, graphite was used as the negative electrode active material instead of the lithium titanium oxide having a spinel crystal structure. The graphite and PVdF as binder were mixed at a ratio of 90% by weight and 10% by weight, respectively, to obtain a mixture. This mixture was added to N-methyl pyrrolidone, followed by mixing, to prepare a slurry.
The applied amount of the slurry was adjusted so that the weight per 1 m$^2$ of the coat applied on each surface was 25 g/m$^2$ after drying.

Comparative Example 11

A nonaqueous electrolyte battery was produced according to the same procedure as in Example 1, except that methyl acetate was used instead of ethyl propionate. The content of methyl acetate in the nonaqueous electrolyte was 40% by weight.

Tables 3 and 4 below summarize the materials and conditions employed to produce the nonaqueous electrolyte batteries of Comparative Examples 1 to 11.

TABLE 3

| | Positive Electrode Active Material | | | | | |
|---|---|---|---|---|---|---|
| | Lithium Manganese Composite Oxide [LMO] | | Lithium Cobalt Composite Oxide [LCO] | | Weight Ratio [LMO:LCO] | Applied Amount for Positive Electrode [g/m$^2$] |
| | Composition | Average Particle Size s [μm] | Composition | Average Particle Size t [μm] | | |
| Comparative Example 1 | LiAl$_{0.25}$Mn$_{1.75}$O$_4$ | 5 | LiCoO$_2$ | 8 | 92:8 | 90 |
| Comparative Example 2 | LiAl$_{0.25}$Mn$_{1.75}$O$_4$ | 5 | LiCoO$_2$ | 8 | 92:8 | 115 |
| Comparative Example 3 | LiAl$_{0.25}$Mn$_{1.75}$O$_4$ | 5 | LiCoO$_2$ | 8 | 92:8 | 60 |
| Comparative Example 4 | LiAl$_{0.25}$Mn$_{1.75}$O$_4$ | 20 | LiCoO$_2$ | 8 | 92:8 | 90 |
| Comparative Example 5 | LiAl$_{0.25}$Mn$_{1.75}$O$_4$ | 0.6 | LiCoO$_2$ | 3 | 92:8 | 90 |

TABLE 3-continued

| | Positive Electrode Active Material | | | | | |
|---|---|---|---|---|---|---|
| | Lithium Manganese Composite Oxide [LMO] | | Lithium Cobalt Composite Oxide [LCO] | | Weight Ratio [LMO:LCO] | Applied Amount for Positive Electrode [g/m²] |
| | Composition | Average Particle Size s [μm] | Composition | Average Particle Size t [μm] | | |
| Comparative Example 6 | LiAl$_{0.25}$Mn$_{1.75}$O$_4$ | 5 | LiCoO$_2$ | 8 | 92:8 | 90 |
| Comparative Example 7 | LiAl$_{0.25}$Mn$_{1.75}$O$_4$ | 5 | LiCoO$_2$ | 8 | 92:8 | 90 |
| Comparative Example 8 | — | — | LiCoO$_2$ | 8 | 0:100 | 58 |
| Comparative Example 9 | LiAl$_{0.25}$Mn$_{1.75}$O$_4$ | 5 | — | — | 100:0 | 90 |
| Comparative Example 10 | LiAl$_{0.25}$Mn$_{1.75}$O$_4$ | 5 | LiCoO$_2$ | 8 | 92:8 | 90 |
| Comparative Example 11 | LiAl$_{0.25}$Mn$_{1.75}$O$_4$ | 5 | LiCoO$_2$ | 8 | 92:8 | 90 |

TABLE 4

| | Negative Electrode Active Material | | Propionate Ester | |
|---|---|---|---|---|
| | Composition | Applied Amount For Negative Electrode [g/m²] | Species | Content w [% by weight] |
| Comparative Example 1 | Li$_4$Ti$_5$O$_{12}$ | 50 | — | 0 |
| Comparative Example 2 | Li$_4$Ti$_5$O$_{12}$ | 50 | Ethyl Propionate | 40 |
| Comparative Example 3 | Li$_4$Ti$_5$O$_{12}$ | 50 | Ethyl Propionate | 40 |
| Comparative Example 4 | Li$_4$Ti$_5$O$_{12}$ | 50 | Ethyl Propionate | 15 |
| Comparative Example 5 | Li$_4$Ti$_5$O$_{12}$ | 50 | Ethyl Propionate | 40 |
| Comparative Example 6 | Li$_4$Ti$_5$O$_{12}$ | 50 | Ethyl Propionate | 5 |
| Comparative Example 7 | Li$_4$Ti$_5$O$_{12}$ | 50 | Ethyl Propionate | 70 |
| Comparative Example 8 | Li$_4$Ti$_5$O$_{12}$ | 50 | Ethyl Propionate | 40 |
| Comparative Example 9 | Li$_4$Ti$_5$O$_{12}$ | 50 | Ethyl Propionate | 40 |
| Comparative Example 10 | C | 25 | Ethyl Propionate | 40 |
| Comparative Example 11 | Li$_4$Ti$_5$O$_{12}$ | 50 | — | 0 |

[Capacity Measurement and Charge]

Examples 1 to 21, and Comparative Examples 1 to 9 and 11

Each of the nonaqueous electrolyte batteries were charged at a constant current of 0.5 A (1 C) in a thermostat maintained at 25° C. until the voltage reached 2.8 V. Subsequently, within the same thermostat, each of the batteries were charged at a constant voltage of 2.8 V until the current value became 25 mA. Thereafter, the nonaqueous electrolyte batteries were allowed to stand in an open circuit state for 30 minutes. Next, the nonaqueous electrolyte batteries were discharged at a constant current of 0.5 A until the voltage became 1.8 V. The above cycle of charge-stand-discharge was repeated three times. The capacity obtained during discharge at the third cycle was taken as nominal capacity. The nominal capacity for the nonaqueous electrolyte battery of Example 1 was 0.5 Ah. Thereafter, the nonaqueous electrolyte batteries were charged at a constant current of 1 C to a charge ratio of 70% (SOC (state of charge) 70%) with respect to the nominal capacity.

Examples 22 and 23

For each of the nonaqueous electrolyte batteries of Examples 22 and 23, the same measurement of the capacity and charging were performed as in the case of the battery of Example 1, except for the points below. First, an end voltage during each constant current charge was set to 3.0 V. The constant voltage charge was carried out at 3.0 V.

Comparative Example 10

For the nonaqueous electrolyte battery of Comparative Example 10, the same measurement of the capacity and charging were performed as in the case of the battery of Example 1, except for the points below. First, an end voltage during constant current charge was set to 4.2 V. The constant voltage charge was carried out at 4.2 V.

Evaluation (Measurement of Gas Generation Amount)

The gas generation amount in the nonaqueous electrolyte battery of each example and comparative example were measured by the procedure below.

The battery at SOC 50% was submerged in a rectangular parallelepiped graduated container containing water, and the volume was read from the position change of the water surface. The volume here was taken as VA [cm³].

Next the battery was drawn up from water. The drawn up battery was charged at a current value of 1 C until the battery voltage reached 2.8 V. Subsequently, the nonaqueous electrolyte battery was charged at a constant voltage of 2.8 V until the current value became 25 mA. The battery in this state was stored under a temperature environment of 60° C. for 100 days. For each of the nonaqueous electrolyte batteries of Example 22 and Example 23, the end voltage during constant current charge was set to 3.0 V. Also, the constant voltage charge was carried out at 3.0 V. For the nonaqueous electrolyte battery of Comparative Example 10, the end voltage during constant current charge was set to 4.2 V. Also, the constant voltage charge was carried out at 4.2 V.

The battery after storage was submerged in a rectangular parallelepiped graduated container containing water, and the volume was read from the position change of the water surface. The volume here was taken as VB [cm$^3$].

Subsequently, by subtracting the volume VA from the volume VB, the gas generation amount for each battery was calculated.

The gas generation amount of each battery is shown in Tables 5 and 6 below as a relative value with the value of the battery of Example 1 set to 100. In the nonaqueous electrolyte battery of Comparative Example 8, a large amount of gas had generated during storage in the temperature environment of 60° C., and the amount of swelling of the battery exceeded a specified value, therefore, the test was stopped. As such, Table 6 below indicates "NA" for the gas generation amount of Comparative Example 8.

(Measurement of Resistance value)

The resistance value of each nonaqueous electrolyte battery was measured by the procedures below.

First, each of the nonaqueous electrolyte batteries were charged by the following procedures.

Each of the nonaqueous electrolyte batteries of Examples 1 to 21 and Comparative Examples 1 to 9 and 11 were charged at a constant current of 1 C in a thermostat maintained at 25° C. until the voltage reached 2.8 V. Subsequently, within the same thermostat, each of the batteries were charged at a constant voltage of 2.8 V until the current value became 25 mA.

Each of the nonaqueous electrolyte batteries of Examples 22 to 23 were charged at a constant current of 1 C in a thermostat maintained at 25° C. until the voltage reached 3.0 V. Subsequently, within the same thermostat, each of the batteries were charged at a constant voltage of 3.0 V until the current value became 25 mA.

The nonaqueous electrolyte battery of Comparative Example 10 was charged at a constant current of 1 C in a thermostat maintained at 25° C. until the voltage reached 4.2 V. Subsequently, within the same thermostat, the battery was charged at a constant voltage of 4.2 V until the current value became 25 mA.

Subsequently, 30% of the nominal capacity for each battery was discharged at a constant current value of 1 C. Then, each of the batteries were left standing over a span of 10 minutes in an open circuit state. After standing, a voltage $V_0$ [V] of each battery was measured.

Next, each battery was discharged for 10 seconds at a constant current value of 10 C (5 A). After discharge, a voltage $V_1$ [V] of each battery was measured. A voltage variation V [V] was determined by subtracting the voltage $V_1$ from the voltage $V_0$. A resistance value [Ω] of each battery was calculated by dividing the voltage variation V [V] by the discharge current value 5 [A].

The resistance value of each battery is shown in Tables 5 and 6 below as a relative value with the resistance value of the battery of Example 1 set to 100.

The values of the capacity ratio p/n, the ratio w/s, and the ratio B/(A+B) of each battery are also shown in Tables 5 and 6.

TABLE 5

| | Capacity Ratio p/n | Ratio w/s | Ratio B/(A + B) | Resistance (Relative Value) | Gas Generation Amount (Relative Value) |
|---|---|---|---|---|---|
| Example 1 | 1.0 | 8 | 0.08 | 100 | 100 |
| Example 2 | 1.0 | 8 | 0.08 | 103 | 105 |
| Example 3 | 1.0 | 8 | 0.08 | 102 | 102 |
| Example 4 | 1.2 | 8 | 0.08 | 102 | 106 |
| Example 5 | 0.8 | 8 | 0.08 | 105 | 110 |
| Example 6 | 1.0 | 2 | 0.08 | 95 | 115 |
| Example 7 | 1.0 | 12 | 0.08 | 110 | 90 |
| Example 8 | 1.0 | 10 | 0.08 | 99 | 102 |
| Example 9 | 1.0 | 40 | 0.08 | 102 | 100 |
| Example 10 | 1.0 | 60 | 0.08 | 105 | 97 |
| Example 11 | 1.0 | 1 | 0.08 | 95 | 105 |
| Example 12 | 1.0 | 4 | 0.08 | 98 | 102 |
| Example 13 | 1.0 | 6 | 0.08 | 101 | 100 |
| Example 14 | 1.0 | 8 | 0.01 | 102 | 114 |
| Example 15 | 1.0 | 8 | 0.04 | 101 | 95 |
| Example 16 | 1.0 | 8 | 0.1 | 100 | 103 |
| Example 17 | 1.0 | 8 | 0.08 | 100 | 100 |
| Example 18 | 1.0 | 8 | 0.08 | 101 | 101 |
| Example 19 | 1.0 | 8 | 0.08 | 103 | 99 |
| Example 20 | 1.0 | 8 | 0.08 | 99 | 101 |
| Example 21 | 1.0 | 8 | 0.08 | 99 | 100 |
| Example 22 | 1.0 | 8 | 0.08 | 110 | 112 |
| Example 23 | 1.0 | 8 | 0.08 | 107 | 109 |

TABLE 6

| | Capacity Ratio p/n | Ratio w/s | Ratio B/(A + B) | Resistance (Relative Value) | Gas Generation Amount (Relative Value) |
|---|---|---|---|---|---|
| Comparative Example 1 | 1.0 | 0 | 0.08 | 108 | 130 |
| Comparative Example 2 | 1.3 | 8 | 0.08 | 105 | 125 |
| Comparative Example 3 | 0.7 | 8 | 0.08 | 106 | 150 |
| Comparative Example 4 | 1.0 | 0.8 | 0.08 | 120 | 97 |
| Comparative Example 5 | 1.0 | 67 | 0.08 | 115 | 128 |
| Comparative Example 6 | 1.0 | 1 | 0.08 | 103 | 125 |
| Comparative Example 7 | 1.0 | 14 | 0.08 | 118 | 98 |
| Comparative Example 8 | 1.0 | 8 | 1 | 97 | NA |
| Comparative Example 9 | 1.0 | 8 | 0 | 98 | 144 |
| Comparative Example 10 | 1.0 | 8 | 0.08 | 118 | 135 |
| Comparative Example 11 | 1.0 | 0 | 0.08 | 108 | 136 |

[Results]

As shown in Tables 5 and 6, each of the nonaqueous electrolyte batteries of Examples 1 to 23 suppressed gas generation more than each of the nonaqueous electrolyte batteries of Comparative Examples 1 to 3, 5, 6, and 8 to 11. In addition, each of the nonaqueous electrolyte batteries of Examples 1 to 23 exhibited a resistance value lower than that of each of the nonaqueous electrolyte batteries of Comparative Examples 4, 5, 7, and 10. Namely, it is apparent from the results shown in Tables 5 and 6 that each of the nonaqueous electrolyte batteries of Examples 1 to 23 had exhibited a low resistance value and suppressed gas generation.

The nonaqueous electrolyte of the nonaqueous electrolyte battery of Comparative Example 1 did not contain a propionate ester. It is considered that this caused the oxidative decomposition of the nonaqueous electrolyte to progress continuously on the surface of the positive electrode active material during storage in a temperature environment of 60° C., resulting in an increase in the amount of gas generated, in this battery.

The nonaqueous electrolyte battery of Comparative Example 2 had a capacity ratio p/n of 1.3. It is considered that this caused the potential of the positive electrode to become too low, whereby the oxidative decomposition of the propionate ester had not progressed sufficiently. It is considered that this resulted in an inability of the battery of Comparative Example 2 to sufficiently suppress decomposition of the nonaqueous electrolyte on the surface of the positive electrode active material-containing layer, causing the oxidative decomposition of the nonaqueous electrolyte on the positive electrode to progress continuously. Also, since the capacity ratio p/n of the battery of Comparative Example 2 was 1.3, the potential of the lithium manganese composite oxide particles having a spinel crystal structure had become too low. It is considered that this caused elution of manganese from the lithium manganese composite oxide particles having a spinel crystal structure and gas generation due to the eluted manganese acting on the negative electrode in the battery.

The nonaqueous electrolyte battery of Comparative Example 3 had a capacity ratio p/n of 0.7. It is considered that this caused the potential of the positive electrode to become too high, promoting decomposition of the nonaqueous electrolyte on the surface of the positive electrode. It is considered that this resulted in continuous progression of the oxidative decomposition of the nonaqueous electrolyte on the positive electrode in the battery.

The nonaqueous electrolyte battery of Comparative Example 4 had a ratio w/s of 0.8. This means that the average particle size s of the lithium manganese composite oxide particles was too large and the specific surface area of the particles was too small with respect to the content w of ethyl propionate. In other words, this means that the content w of ethyl propionate in the battery was too large with respect to the specific surface area of the lithium manganese composite oxide particles. It is considered that this caused the oxidative decomposition products of ethyl propionate to be excessively formed on the positive electrode in the battery, resulting in a high resistance value.

The nonaqueous electrolyte battery of Comparative Example 5 had a ratio w/s of 67. This means that the average particle size s of the lithium manganese composite oxide particles was too small and the specific surface area of the particles was too large with respect to the content w of ethyl propionate. It is considered that this caused the oxidative decomposition reaction of ethyl propionate on the lithium manganese composite oxide particles to progress excessively, resulting in excessive formation of the oxidative decomposition products of ethyl propionate. It is considered that this resulted in an increased resistance value of the battery. On the other hand, it is considered that since the ratio w/s was 67 for this battery, the formation of the oxidative decomposition products of ethyl propionate was insufficient for suppressing gas generation caused by the lithium manganese composite oxide particles, resulting in continuous progression of the oxidative decomposition of the nonaqueous electrolyte on the positive electrode. These are considered to be the reasons why the amount of gas generated had increased in the battery.

In the nonaqueous electrolyte battery of Comparative Example 6, the content w of ethyl propionate in the non-aqueous electrolyte was 5% by weight, which was too small. It is considered that this made the formation of the oxidative decomposition products of ethyl propionate on the positive electrode insufficient in the battery. It is considered that this resulted in continuous progression of the oxidative decomposition of the nonaqueous electrolyte on the positive electrode, causing an increase in the amount of gas generated in the battery.

In the nonaqueous electrolyte battery of Comparative Example 7, the content w of ethyl propionate in the nonaqueous electrolyte was 70% by weight, which was too large. It is considered that this caused the oxidative decomposition products of ethyl propionate to be excessively formed on the positive electrode in the battery. It is considered that this resulted in an increase in the interfacial resistance of the positive electrode, causing an increase in the resistance of the battery.

The positive electrode of the nonaqueous electrolyte battery of Comparative Example 8 did not contain the lithium manganese composite oxide particles having a spinel structure. It is considered that this prevented the oxidative decomposition products of ethyl propionate from stably existing in the battery, resulting in continuous progression of the decomposition of the nonaqueous electrolyte, whereby a large amount of gas had been generated.

The positive electrode of the nonaqueous electrolyte battery of Comparative Example 9 did not contain lithium cobaltate. It is considered that this prevented utilization of the catalytic action of the lithium cobaltate on the oxidative decomposition reaction of ethyl propionate in the battery, resulting in an inability to sufficiently form the oxidative decomposition reaction products of ethyl propionate. It is considered that this resulted in a continuous progression of the oxidative decomposition of the nonaqueous electrolyte on the positive electrode, causing an increase in the amount of gas generated in the battery.

The negative electrode of the nonaqueous electrolyte battery of Comparative Example 10 contained graphite as a negative electrode active material. It is considered that this caused reductive decomposition of ethyl propionate on the negative electrode, preventing utilization of the action of the oxidative decomposition products of the propionate ester on the positive electrode. It is considered that this resulted in continuous progression of the oxidative decomposition of the nonaqueous electrolyte on the positive electrode, causing an increase in the amount of gas generated in the battery of Comparative Example 10. Also, the reason why the battery of Comparative Example 10 exhibited a high resistance value is considered to be as follows. First, the reductive decomposition of ethyl propionate on the negative electrode is considered as having been significant in the battery of Comparative Example 10. A product formed by the reductive decomposition served as a coating on the negative electrode. This coating, which had poor electrical conductivity, increased the resistance of the negative electrode. It is considered that as a result, the battery of Comparative Example 10 exhibited a high resistance value.

The nonaqueous electrolyte of the nonaqueous electrolyte battery of Comparative Example 11 did not contain a propionate ester but contained methyl acetate. Methyl acetate is even less resistant to oxidative decomposition than propionate esters. It is considered therefore, that in this battery, oxidative decomposition of the methyl acetate itself had proceeded. Also, it is considered that the oxidative decomposition products of methyl acetate had a lower effect of suppressing the decomposition reaction of the nonaqueous electrolyte on the positive electrode than the oxidative decomposition products of the propionate ester. It is considered that this resulted in continuous progression of the oxidative decomposition of the nonaqueous electrolyte on the positive electrode, causing an increase in gas generation in the battery.

According to at least one embodiment and example described above, a nonaqueous electrolyte battery is provided. The nonaqueous electrolyte battery includes a positive electrode, a negative electrode, and a nonaqueous electrolyte. The positive electrode includes a positive electrode active material-containing layer. The positive electrode active material-containing layer contains lithium manganese composite oxide particles having a spinel crystal structure and lithium cobalt composite oxide particles. The negative electrode includes a titanium-containing oxide. The nonaqueous electrolyte contains a propionate ester. The nonaqueous electrolyte battery satisfies equations $0.8 \leq p/n \leq 1.2$ and $1 \leq w/s \leq 60$. A content w of the propionate ester in the nonaqueous electrolyte is in a range of 10% by weight to 60% by weight. The nonaqueous electrolyte battery can suppress elution of manganese from the lithium manganese composite oxide and decomposition of the nonaqueous electrolyte on a surface of the positive electrode active material-containing layer, while maintaining a low resistance value. As a result, the nonaqueous electrolyte battery according to the first embodiment can exhibit a low resistance value and suppress gas generation.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A nonaqueous electrolyte battery comprising:
   a positive electrode comprising a positive electrode active material-containing layer, the positive electrode active material-containing layer comprising lithium manganese composite oxide particles having a spinel crystal structure and lithium cobalt composite oxide particles;
   a negative electrode comprising a titanium-containing oxide; and
   a nonaqueous electrolyte comprising a propionate ester, the nonaqueous electrolyte battery satisfying equations $0.8 \leq p/n \leq 1.2$ and $1 \leq w/s \leq 60$,
   where p denotes a capacity [mAh/cm$^2$] per unit area of the positive electrode,
   n denotes a capacity [mAh/cm$^2$] per unit area of the negative electrode,
   w denotes a content of the propionate ester in the nonaqueous electrolyte and is in a range of 10% by weight to 60% by weight,
   and s denotes an average particle size [μm] of the lithium manganese composite oxide particles.

2. The nonaqueous electrolyte battery according to claim 1, wherein the average particle size s is in a range of 1 μm to 10 μm.

3. The nonaqueous electrolyte battery according to claim 1, wherein the lithium manganese composite oxide particles have a composition represented by general formula $Li_aM_xMn_{2-x}O_4$, where $0 < a \leq 1.2$ and $0.2 \leq x \leq 0.7$ are satisfied, and M is at least one element selected from the group consisting of Mg, Ti, Cr, Fe, Co, Zn, Al, Li, and Ga.

4. The nonaqueous electrolyte battery according to claim 1, satisfying equation $0.8 \leq p/n \leq 1$.

5. The nonaqueous electrolyte battery according to claim 1, satisfying equation $0.01 \leq B/(A+B) \leq 0.1$,
   where A is a content [wt %] of the lithium manganese composite oxide particles in the positive electrode active material-containing layer, and B is a content [wt %] of the lithium cobalt composite oxide in the positive electrode active material-containing layer.

6. The nonaqueous electrolyte battery according to claim 5, satisfying equation $0.01 \leq B/(A+B) \leq 0.04$.

7. The nonaqueous electrolyte battery according to claim 1, wherein the titanium-containing oxide comprises a lithium titanium composite oxide having a spinel crystal structure.

8. A battery pack comprising the nonaqueous electrolyte battery according to claim 1.

* * * * *